(12) United States Patent
Tsuchiya et al.

(10) Patent No.: US 8,397,203 B2
(45) Date of Patent: Mar. 12, 2013

(54) PLANAR MANUFACTURING DRAWING PRODUCTION SUPPORT DEVICE, PLANAR MANUFACTURING DRAWING PRODUCTION SUPPORT METHOD, PLANAR MANUFACTURING DRAWING PRODUCTION SUPPORT PROGRAM AND BRANCH ANGLE DESIGN SUPPORT DEVICE

(75) Inventors: Shinji Tsuchiya, Shizuoka (JP); Kouki Nagakura, Shizuoka (JP); Yousuke Sugioka, Shizuoka (JP); Masayoshi Sawai, Shizuoka (JP)

(73) Assignee: Yazaki Corporation, Tokyo (JP)

(*) Notice: Subject to any disclaimer, the term of this patent is extended or adjusted under 35 U.S.C. 154(b) by 155 days.

(21) Appl. No.: 12/735,917

(22) PCT Filed: Feb. 25, 2009

(86) PCT No.: PCT/JP2009/053340
§ 371 (c)(1),
(2), (4) Date: Nov. 11, 2010

(87) PCT Pub. No.: WO2009/107622
PCT Pub. Date: Sep. 3, 2009

(65) Prior Publication Data
US 2011/0046763 A1    Feb. 24, 2011

(30) Foreign Application Priority Data

Feb. 27, 2008  (JP) ................................ 2008-046603
Feb. 27, 2008  (JP) ................................ 2008-046605

(51) Int. Cl.
*G06F 17/50* (2006.01)
(52) U.S. Cl. ......................................... 716/137; 700/98
(58) Field of Classification Search .................. 716/137; 700/98
See application file for complete search history.

(56) References Cited

FOREIGN PATENT DOCUMENTS
JP          2001-093361 A        4/2001
(Continued)

OTHER PUBLICATIONS

Translation 2002231074 (English Translation of JP2002231074—"Design Method of Wire Harness and Program to Implement the Method by Computer" to Osaki et al.).*
International Search Report dated May 19, 2009, issued in PCT/JP2009/053340.

(Continued)

*Primary Examiner* — Jack Chiang
*Assistant Examiner* — Magid Dimyan
(74) *Attorney, Agent, or Firm* — Edwards Wildman Palmer LLP; James E. Armstrong, IV; Stephen D. LeBarron

(57) ABSTRACT

The present invention aims to improve accuracy of a planar manufacturing drawing used to instruct manufacture of a three-dimensional structure in a planar form. According to path plan information is acquired by a path plan information acquisition unit 11a and manufacturing requirement information is acquired by a manufacturing requirement information acquisition unit, a layout configuration production unit 11c produces a layout configuration model in which the three-dimensional structure is laid out in a planar manner based on a manufacture layout and distortion of the wire harness. Then, a simulation unit 11d simulates a transformation from the layout configuration model to the mounting configuration model with which the three-dimensional structure is mounted to a mount object. Then, an evaluation item evaluating unit 11e evaluates a predetermined evaluation item by comparing the simulation result and the three-dimensional structure indicated by the path plan information. Then, an evaluation result information output unit 11f outputs the evaluation result to support path designing of the three-dimensional structure and/or production of the planar manufacturing drawing.

4 Claims, 18 Drawing Sheets

FOREIGN PATENT DOCUMENTS

| | | |
|---|---|---|
| JP | 2002-231074 A | 8/2002 |
| JP | 2003-022721 A | 1/2003 |
| JP | 2003-151383 A | 5/2003 |
| JP | 2008-234039 A | 10/2008 |

OTHER PUBLICATIONS

Notice of Rejection mailed Jan. 24, 2012, issued for the corresponding Japanese patent application No. 2008-046603 and English translation thereof.

* cited by examiner

PLANAR MANUFACTURING DRAWING PRODUCTION SUPPORT DEVICE, PLANAR MANUFACTURING DRAWING PRODUCTION SUPPORT METHOD, PLANAR MANUFACTURING DRAWING PRODUCTION SUPPORT PROGRAM AND BRANCH ANGLE DESIGN SUPPORT DEVICE

FIELD OF THE INVENTION

The present invention relates to a planar manufacturing drawing production support device, a planar manufacturing drawing production support method and a planar manufacturing drawing production support program which are used when providing an instruction of manufacture of a three-dimensional structure constituted of a plurality of wire harnesses on a wiring board and which support production of a planar manufacturing drawing in which the three-dimensional structure is laid out in a planar form. The present invention further relates to a branch angle design support device which supports designing of a branch angle at a branch point on the wire harness when laying out, in a planar layout configuration, the wire harness constituted of a plurality of electric wires bundled together forming the three-dimensional structure.

DESCRIPTION OF THE RELATED ART

Various electronic instruments are mounted to a motor vehicle as a moving body. Thus, the motor vehicle includes a harness wired to transmit, for example, electric power from a power source and control signals from a computer to the electric instruments. The wire harness includes a plurality of electric wires and connectors connected respectively to ends of the electric wires.

The electric wire includes a conductive core wire and a cover portion made of an insulating synthetic resin and covering the core wire, thus the electric wire is a so-called covered electric wire. The connector includes a conductive terminal clamp and an insulating connector housing. The terminal clamp is attached to an end of the electric wire and is electrically connected with the core wire. The connector housing is formed into a box-like shape and receives the terminal clamp.

When preparing the wire harness, first the electric wires are cut to the predetermined length, and then the terminal clamps are attached to the ends of the electric wires. The electric wires are connected to each other as needed. Then, the terminal clamps are inserted into the connector housings. In this manner, the wire harness described above is prepared.

Designing of the wire harness proceeds concurrently with designing of a vehicle and such to which the wire harness is wired. In general, in a path layout of the wire harness, a manufacturer of the vehicle and such (simply called a vehicle manufacturer) provides a request, and then a parts manufacturer receiving the request manufactures the wire harness which satisfies the request using manufacturing jigs. Specifically, the vehicle manufacturer produces, by designing a circuit, circuit information indicative of a type, size and a circuit and such, and then, according to this circuit information, produces path plan information indicative of a three-dimensional path plan in which supplemental equipment, a fixation position thereof and a shape of a body and such are taken into account. Then, the three-dimensional wire harness indicated by the path plan information is converted, for example manually by an operator, into a two-dimensional (planar) wire harness to produce a two-dimensional (planar) manufacturing drawing. According to the released two-dimensional manufacturing drawing, the vehicle manufacturer then provides an instruction of manufacture of the wire harness to the parts manufacturer.

In addition, Patent Literature 1 discloses a wire harness design support method which may easily convert three-dimensional data of the wire harness into the two-dimensional drawing. In Patent Literature 1, a layout plane for laying out the wire harness data in a two-dimensional manner is set, the wire harness data is divided into a plurality of segments at a predetermined dividing point, and the each segment is laid out such that all the segments are included in the layout plane. In such manner, the three-dimensional data of the wire harness can be easily converted into the two-dimensional drawing, reducing design time of the wire harness.

[Patent Literature 1] Japanese Patent Application Publication No. 2003-22721

SUMMARY OF THE INVENTION

Technical Problem

When the vehicle manufacturer instructs manufacture of the wire harness to the parts manufacturer according to the two-dimensional manufacturing drawing, the parts manufacturer reviews a jig layout of a wiring board at which the wire harness is actually manufactured according to the two-dimensional manufacturing drawing, and further reviews whether or not the wire harness manufactured on the wiring board can be reproduced into a shape indicated in the path plan information requested by the vehicle manufacturer. If any problem arises in the review, a design change to solve the problem is requested to the vehicle manufacturer. Therefore, many changes from the path plan designed by the vehicle manufacturer causes an increase in modification. Therefore, there is a problem that a period for transition from a design process to a manufacture process becomes long, causing a delay in the manufacture.

The present invention is intended to address the above-described problem. Therefore, an object of the present invention is to provide a planar manufacturing drawing production support device, a planar manufacturing drawing production support method and a planar manufacturing drawing production support program as well as a branch angle design support device which can improve an accuracy of the planar manufacturing drawing used when providing an instruction of manufacture of the three-dimensional structure.

Solution to Problem

In order to solve the above-described problem and achieve the above-described object, according to a first aspect of the present invention, there is provided, as shown in a basic configuration diagram of FIG. 1, a planar manufacturing drawing production support device which supports production of a planar manufacturing drawing in which a three-dimensional structure is laid out in a planar manner, according to path plan information indicative of a three-dimensional path plan of the plurality of wire harnesses forming the three-dimensional structure, in order to provide an instruction of manufacture of the three-dimensional structure in a planar form. The planar manufacturing drawing production support device includes: a path plan information acquisition unit 11*a* acquiring the path plan information corresponding to the three-dimensional structure as a support object; a manufacturing requirement information acquisition unit 11*b* acquiring manufacturing requirement information indicative of a layout condition used when laying out the three-dimensional structure in a planar form during manufacture; a layout configuration production unit 11c producing, according to the acquired path plan information and the acquired manufacturing requirement information, a layout configuration model in which the three-dimensional structure is laid out in a planar manner; a simulation unit 11d simulating a transformation from the layout configuration model produced by the layout configuration production unit 11c to a mounting configuration model with which the three-dimensional structure is mounted to a mount object; an evaluation unit 11e performing an evaluation of predetermined evaluation items by comparing a simulation result obtained by the simulation unit 11d with the three-dimensional structure indicated by the path plan information; and an evaluation result information output unit 11f outputting evaluation result information indicative of an evaluation result obtained by the evaluation unit 11e in order to support at least one of path designing of the three-dimensional structure and production of the planar manufacturing drawing.

According to the planar manufacturing drawing production support device of the first aspect of the present invention described above, the path plan information is acquired by the path plan information acquisition unit 11a, and the manufacturing requirement information is acquired by the manufacturing requirement information acquisition unit 11b. Then, according to these information, the layout configuration production unit 11c produces the layout configuration model in which the three-dimensional structure is laid out in a planar manner upon taking into account a manufacture layout and a distortion of the wire harness. Then, the simulation unit 11d simulates the transformation from the above-described layout configuration model to the mounting configuration model with which the three-dimensional structure is mounted to the mount object. Then, the evaluation item evaluating unit 11e evaluates predetermined evaluation items by comparing the simulation result with the three-dimensional structure indicated by the path plan information. Then, an evaluation result information output unit 11f outputs the evaluation result to support at least one of path designing of the three-dimensional structure and production of the planar manufacturing drawing.

According to a second aspect of the present invention, there is provided, as shown in the basic configuration diagram of FIG. 1, the planar manufacturing drawing production support device including the circuit information acquisition unit 11g acquiring the circuit information indicative of the circuit formed by the wire harness. Furthermore, the layout configuration production unit 11c produces the layout configuration model in which the three-dimensional structure is laid out in a planar manner according to the acquired path plan information, the acquired manufacturing requirement information and the acquired circuit information.

According to the planar manufacturing drawing production support device of the second aspect of the present invention described above, when the circuit information corresponding to the three-dimensional structure as the support object is acquired by the circuit information acquisition unit 11g, the layout configuration production unit 11c produces the layout configuration model according to the path plan information, the manufacturing requirement information and the circuit information.

In order to solve the above-described problem, according to a third aspect of the present invention, there is provided a planar manufacturing drawing production support method for supporting production of a planar manufacturing drawing in which a three-dimensional structure is laid out in a planar manner, according to path plan information indicative of a three-dimensional path plan of the plurality of wire harnesses forming the three-dimensional structure, in order to provide an instruction of manufacture of the three-dimensional structure in a planar form. The planar manufacturing drawing production support method includes the steps of: acquiring the path plan information corresponding to the three-dimensional structure as a support object; acquiring manufacturing requirement information indicative of manufacturing requirements for manufacturing the three-dimensional structure in a planar form; producing, according to the acquired path plan information and the acquired manufacturing requirement information, a layout configuration model in which the three-dimensional structure is laid out in a planar manner; simulating a transformation from the layout configuration model produced in the step of producing a layout configuration model to a mounting configuration model with which the three-dimensional structure is mounted to a mount object; performing an evaluation of predetermined evaluation items by comparing a simulation result obtained from the step of simulating with the three-dimensional structure indicated by the path plan information; and outputting evaluation result information indicative of an evaluation result obtained from the step of performing an evaluation in order to support at least one of path designing of the three-dimensional structure and production of the planar manufacturing drawing.

According to the planar manufacturing drawing production support method of the third aspect of the present invention described above, the path plan information and the manufacturing requirement information corresponding to the three-dimensional structure as the support object are acquired, and according to these information, the layout configuration model in which the three-dimensional structure is laid out in a planar manner upon taking into account the manufacture layout and the distortion of the wire harness and such is produced. Then, the transformation from the above-described layout configuration model to the mounting configuration model for mounting the three-dimensional structure to the mount object is simulated. After that, the predetermined evaluation items are evaluated by comparing the simulation result with the three-dimensional structure indicated by the path plan information. Then, the evaluation result is outputted to support at least one of path designing of the three-dimensional structure and production of the planar manufacturing drawing.

In order to solve the above-described problem, according to a fourth aspect of the present invention, there is provided, as shown in the basic configuration diagram of FIG. 1, a planar manufacturing drawing production support program product including a computer-readable program code executed to cause a computer to support production of a planar manufacturing drawing in which a three-dimensional structure is laid out in a planar manner, according to path plan information indicative of a three-dimensional path plan of the plurality of wire harnesses forming the three-dimensional structure, in order to provide an instruction of manufacture of the three-dimensional structure in a planar form. The computer-readable program code is executed to cause the computer to function as: a path plan information acquisition unit 11a acquiring the path plan information corresponding to the three-dimensional structure as a support object; a manufacturing requirement information acquisition unit 11b acquiring manufacturing requirement information indicative of manufacturing requirements for manufacturing the three-dimensional structure in a planar form; a layout configuration production unit 11c producing, according to the acquired path plan information and the acquired manufacturing requirement information, a layout configuration model in which the three-dimensional structure is laid out in a planar manner; a simulation unit 11*d* simulating a transformation from a layout configuration model produced by the layout configuration production unit 11*c* to a mounting configuration model with which the three-dimensional structure is mounted to a mount object; an evaluation unit 11*e* performing an evaluation of predetermined evaluation items by comparing a simulation result obtained from the simulation unit 11*d* with a three-dimensional structure indicated by the path plan information; and an evaluation result information output unit 11*f* outputting evaluation result information indicative of an evaluation result obtained from the evaluation unit 11*e* in order to support at least one of path designing of the three-dimensional structure and production of the planar manufacturing drawing.

According to the planar manufacturing drawing production support program of the fourth aspect of the present invention described above, the computer acquires the path plan information and the manufacturing requirement information corresponding to the three-dimensional structure as the support object, and according to these information, the computer produces the layout configuration model in which the three-dimensional structure is laid out in a planar manner based on the manufacture layout and the distortion of the wire harness and such. Then, the computer simulates the transformation from the above-described layout configuration model to the mounting configuration model for mounting the three-dimensional structure to the mount object, then evaluates the predetermined evaluation items by comparing the simulation result with the three-dimensional structure indicated by the path plan information, and then outputs the evaluation result to support at least one of path designing of the three-dimensional structure and production of the planar manufacturing drawing.

Furthermore, according to a fifth aspect of the present invention, there is provided, as shown in a basic configuration diagram of FIG. 10, a branch angle designing support device which supports designing of a branch angle at a branch point of a wire harness when laying out in a planar manner the wire harness constituted of a plurality of electric wires bundled together constituting a three-dimensional structure. The branch angle designing support device includes: a path information acquisition unit 11A acquiring path information indicative of a path of the wire harness; a circuit information acquisition unit 11B acquiring circuit information indicative of a circuit of the wire harness; an electric wire path calculation unit 11C associating, according to an end of the each of the plurality of electric wires, the path information acquired by the path information acquisition unit 11A with the circuit information acquired by the circuit information acquisition unit 11B, and calculating, from the associated information, an electric wire path of the each of the plurality of electric wires in the planar layout; a branch point information production unit 11D producing, according to the plurality of electric wire paths calculated by the electric wire path calculation unit 11C, branch point information for displaying a flow of the each of the electric wires at the branch point on the wire harness; and a branch point information output unit 11E outputting the branch point information produced by the branch point information production unit 11D to support designing of the branch angle.

According to the planar manufacturing drawing production support device of the fifth aspect of the present invention described above, the path information and the circuit information are acquired by the path information acquisition unit 11A and the circuit information acquisition unit 11B, the electric wire path calculation unit 11C associates, according to the respective ends of the plurality of electric wires, the path information to the circuit information and calculates, from the associated information, the electric wire path of each of the plurality of electric wires in the planar layout. Then, the branch point information for indication of the respective flow of the electric wires at the branch point on the wire harness is produced by the branch point information production unit 11D produces according to the information of the plurality of electric wires and then outputted, for example, to the display device and the printer by the branch point information output unit 11E to support designing of the branch angle.

Furthermore, the above-described branch angle design support device includes electric wire information collection unit 11F collecting electric wire information corresponding to each of the plurality of electric wires. Also, the branch point information production unit 11D produces according to the electric wire information and the electric wire path, the branch point information used to visually display the flow and the diameter of the each electric wire.

According to the branch angle design support device described above, after the electric wire information indicating for example the diameter and the rigidity of each of the plurality of electric wires are collected by the electric wire information collection unit 11F, then the branch point information production unit 11D produces, according to the electric wire information and the electric wire path, the branch point information used to visually display the flow and the diameter of the each electric wire.

Furthermore, the above-described branch angle design support device may include a cross-sectional shape information production unit 11G producing, according to the electric wire information, the electric wire path information and the branch point information collected by the electric wire information collection unit 11F, the cross-sectional shape information indicative of a cross-sectional shape of at least one of the main wire or the branch wire branching from the main wire at the branch point. Also, the above-described branch angle design support device may include a cross-sectional shape information output unit 11H outputting the cross-sectional shape information produced by the cross-sectional shape information production unit 11G to support designing of the branch angle.

According to the branch angle design support device described above, after the cross-sectional shape information indicative of the cross-sectional shape of at least one of the main wire or the branch wire branching from the main wire at the branch point is produced by the cross-sectional shape information production unit 11G, then this cross-sectional shape information is outputted by the cross-sectional shape information output unit 11H to support designing of the branch angle.

Furthermore, the above-described branch angle design support device includes a branch angle acquisition unit 11I acquiring the branch angle at the branch point. Also, the branch point information production unit 11D calculates, according to the branch angle acquired by the branch angle acquisition unit 11I as well as the electric wire information and the electric wire path, at least one of the inner course and the outer course of a group of electric wires branching at the above-described branch angle, and thereby produces the branch point information having course data indicative of that course.

According to the branch angle design support device described above, after the branch angle is acquired by the branch angle acquisition unit 11I, then the branch point information production unit 11D calculates, according to the branch angle and the electric wire information and the electric wire path, at least one of the inner course and the outer course of the group of electric wires branching at the branch angle, and thereby produces the branch point information having course data indicative of that course.

Furthermore, there is provided a branch angle design support method for supporting designing of a branch angle at a branch point of a wire harness when laying out in a planar manner the wire harness constituted of a plurality of electric wires bundled together constituting a three-dimensional structure. The branch angle designing support method includes the steps of: acquiring path information indicative of a path of the wire harness; acquiring circuit information indicative of a circuit of the wire harness; associating, according to an end of the each of the plurality of electric wires, the path information with the circuit information, and calculating, from the associated information, an electric wire path of the each of the plurality of electric wires in the planar layout; producing, according to the plurality of electric wire paths, branch point information for displaying a flow of the each of the electric wires at the branch point on the wire harness; and outputting the branch point information to support designing of the branch angle.

According to the branch angle design support method described above, when the path information and the circuit information corresponding to the wire harness are acquired, the path information and the circuit information are associated with each other, according to the respective ends of the plurality of electric wires, and from the associated information, the electric wire path of each of the plurality of electric wires in the planar layout is calculated. Then, according to the information of the plurality of electric wires, the branch point information for indication of the respective flow of the electric wires at the branch point on the wire harness is produced and then outputted, for example, to the display device and the printer to support designing of the branch angle.

Furthermore, as shown in the basic configuration diagram of FIG. 10, there is provided a branch angle design support program product including a computer-readable program code executed to cause a computer to function as: a path information acquisition unit 11A acquiring path information indicative of a path of the wire harness; a circuit information acquisition unit 11B acquiring circuit information indicative of a circuit of the wire harness; an electric wire path calculation unit 11C associating, according to an end of the each of the plurality of electric wires, the path information acquired by the path information acquisition unit 11A with the circuit information acquired by the circuit information acquisition unit 11B, and calculating, from the associated information, an electric wire path of the each of the plurality of electric wires in the planar layout; a branch point information production unit 11D producing, according to the plurality of electric wire paths calculated by the electric wire path calculation unit 11C, branch point information for displaying a flow of the each of the electric wires at the branch point on the wire harness; and a branch point information output unit 11E outputting the branch point information produced by the branch point information production unit 11D to support designing of the branch angle.

According to the branch angle design support program described above, the computer acquires the path information and the circuit information corresponding to the wire harness, and then associates the path information with the circuit information, according to the respective ends of the plurality of electric wires. Then, the computer calculates, from the associated information, the electric wire path of each of the plurality of electric wires in the planar layout. Then, according to the information of the plurality of electric wires, the branch point information for indication of the respective flow of the electric wires at the branch point on the wire harness is produced and then outputted, for example, to the display device and the printer to support designing of the branch angle.

Advantageous Effects of the Invention

As explained above, according to the first, third and fourth aspect of the present invention, by acquiring the path plan information and the manufacturing requirement information, the layout configuration model based on the manufacture requirements is produced, and the evaluation is performed according to the simulation result obtained from the transformation to the mounting configuration model, and the evaluation result is outputted to support at least one of the designing of the path of the three-dimensional structure and the production of the planar manufacturing drawing. Therefore, factors which cause the design change can be reduced at a time of production of the path plan information before production of the planar manufacturing drawing. Therefore, an accuracy of the planar manufacturing drawing produced according to the path plan information can be improved, thereby reducing generation of defects during the manufacturing process. Consequently, a transition from the designing process to the manufacturing process can be attained efficiently. Furthermore, the number of reviewing processes in the manufacturing process can be reduced and mock-ups of the manufacturing jigs can be efficiently dumped, thereby shortening a lifecycle of the three-dimensional structure 2.

According to the second aspect of the present invention, in addition to the advantageous effect of the first aspect of the invention, the circuit information of the three-dimensional structure is acquired and so the layout configuration model is produced based on the circuit information, the path plan information and the manufacturing requirement information. Therefore, a direction and such of a connector to be connected to the wire harness can be taken into account, thus the simulation of the transformation from the layout configuration model to the mounting configuration model can be performed even more accurately. Consequently, a quality of a final planar manufacturing drawing produced according to the path plan information can be improved even more, reducing generation of the design changes.

As explained above, according to the branch angle design support device according to the fifth aspect of the present invention, by associating the acquired path information and the acquired circuit information with each other, the electric wire path in the planar layout of each of the plurality of electric wires is calculated, and then the branch point information for displaying the flow of the each electric wire at the branch point on the wire harness is produced and outputted. Therefore, the designer can check the flow of the each electric wire at the branch point on the wire harness as well as the number of branching electric wires, thus can support the design of the branch angle such that the stress of the branching bundle of electric wires becomes small. Therefore, the generation of design change during the manufacture of the wire harness can be reduced, the wire harness can be easily prepared, and the durability of the wire harness can be improved.

Furthermore, according to the above-described branch angle design support device, the electric wire information corresponding to each of the plurality of electric wires is collected, and according to the electric wire information and the electric wire paths, the branch point information for visually displaying the flow and the diameter of the respective electric wires is produced. Consequently, the designer can check the diameter of the electric wire in addition to the flow of the each electric wire at the branch point of the wire harness as well as the number of the bundles of electric wires. Therefore, the branch angle can be arranged to be more realistic angle. Therefore, the generation of the design change during the manufacture of the wire harness can be reduced even more.

Furthermore, according to the above-described branch angle design support device, the cross-sectional shape information indicative of a cross-sectional shape of at least one of the main wire and the branch wire branching from the main wire for the branch point is produced, according to the electric wire and the electric wire path and the branch point, and outputted to support the designing of the branch angle. Therefore, the designer can check the cross-sectional shape of the branching bundle of electric wires, thus, based on the cross-sectional shape of the bundle of electric wires, the designer can arrange the branch angle to be more realistic angle.

Moreover, according to the above-described branch angle design support device, the branch angle at the branch point is acquired, and at least one of the inner course and the outer course of the group of electric wires branching at the above-described branch angle is calculate, and then the branch point information having the course data indicative of that course is produced. Therefore, the designer can check the inner course and the outer course of the branching group of electric wires, thus can arrange the branch angle to be a realistic angle. In addition, the course arrangement at the branch point can be taken into account for the electric wires extending through the same path, so the length of the each electric wire can be calculated even more accurately. Consequently, the amount of electric wires used can be reduced.

REFERENCE SIGNS LIST 1 three-dimensional structure designing system
2 three-dimensional structure
3 electric wire
10 planar manufacturing drawing production support device
11a path plan information acquisition unit (CPU)
11b manufacturing requirement information acquisition unit (CPU)
11c layout configuration production unit (CPU)
11d simulation unit (CPU)
11e evaluation unit (CPU)
11f evaluation result information output unit (CPU)
11g circuit information acquisition unit (CPU)
10A branch angle design support device
11A path information acquisition unit (CPU)
11B circuit information acquisition unit (CPU)
11C electric wire path calculation unit (CPU)
11D branch point information production unit (CPU)
11E branch point information output unit (CPU)
11F electric wire information collection unit (CPU)
11G cross-sectional shape information production unit (CPU)
11H cross-sectional shape information output unit (CPU)
11I branch angle acquisition unit (CPU)
W1 wire harness
W2 connector
Wm main wire
Wb branch wire

DESCRIPTION OF EMBODIMENTS

Referring now to FIG. 2 through FIG. 9, the following describes an embodiment for supporting production of a planar manufacturing drawing used to instruct manufacture of a three-dimensional structure formed on a wiring board with a plurality of wire harnesses (W/H) using a three-dimensional structure designing system having a planar manufacturing drawing production support device according to the present invention.

Figure 2:
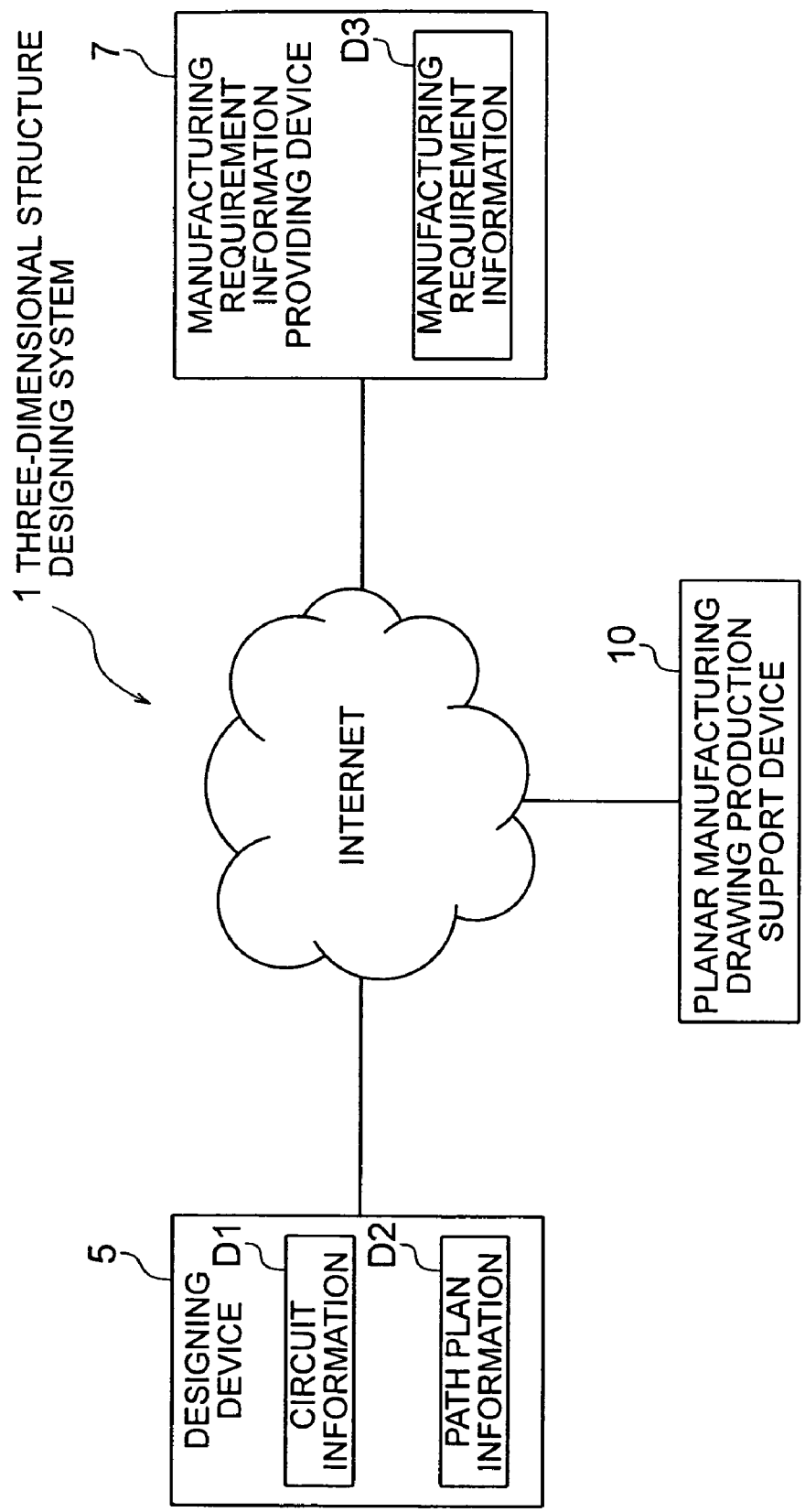
FIG. 2 is a system configuration diagram showing a schematic diagram of a three-dimensional structure designing system.

In FIG. 2, a three-dimensional structure designing system 1 designs, with a computer, a three-dimensional structure 2 (refer to FIG. 3) to be mounted to a vehicle, and then provides an instruction of manufacture of the designed three-dimensional structure 2 to, for example, a parts manufacturer according to a released planar manufacturing drawing.

Figure 3:
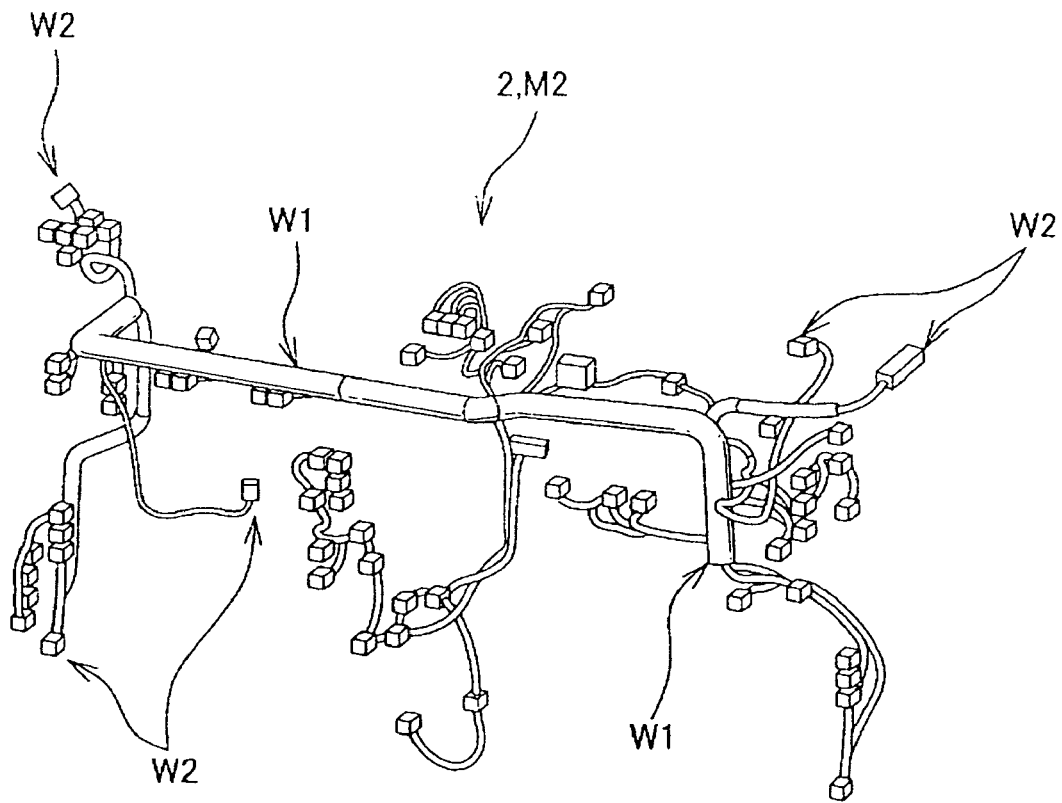
FIG. 3 is a perspective view showing one example of the three-dimensional structure and a mounting configuration model.

The three-dimensional structure 2 includes, as shown in FIG. 3, a wire harness W1 constituted of a plurality of electric wires (a bundle of electric wires) and a connector W2 provided for example at an end of the wire harness W1. The electric wire includes a conductive core wire and a cover portion made of an insulating synthetic resin and covering the core wire. The connector W2 includes a conductive terminal clamp and an insulating connector housing.

The three-dimensional designing system 1 includes, as shown in FIG. 2, a designing device 5, a manufacturing requirement information providing device 7 and a planar manufacturing drawing production support device 10. The designing device 5, the manufacturing requirement information providing device 7 and the planar manufacturing drawing production support device 10 can commutate with each other via an internet.

First, the designing device 5 is provided for example to a vehicle manufacturer designing the three-dimensional structure 2 and is performed by a computer and such. The designing device 5, by executing an application program, designs a circuit of the three-dimensional structure 2 for the vehicle and thereby produces circuit information D1, and then plans a path of the circuit designed taking into account supplemental equipment mounted to the vehicle and a fixation position thereof as well as a shape of a body and such, and thereby produces path plan information D2.

An example of the circuit information D1 is arranged to include various data such as a type and a size of the wire harness W1 and a connection point of the wire harness W1 (From-To) and is stored in a hard disk device and such as a circuit information database (DB).

Figure 4:
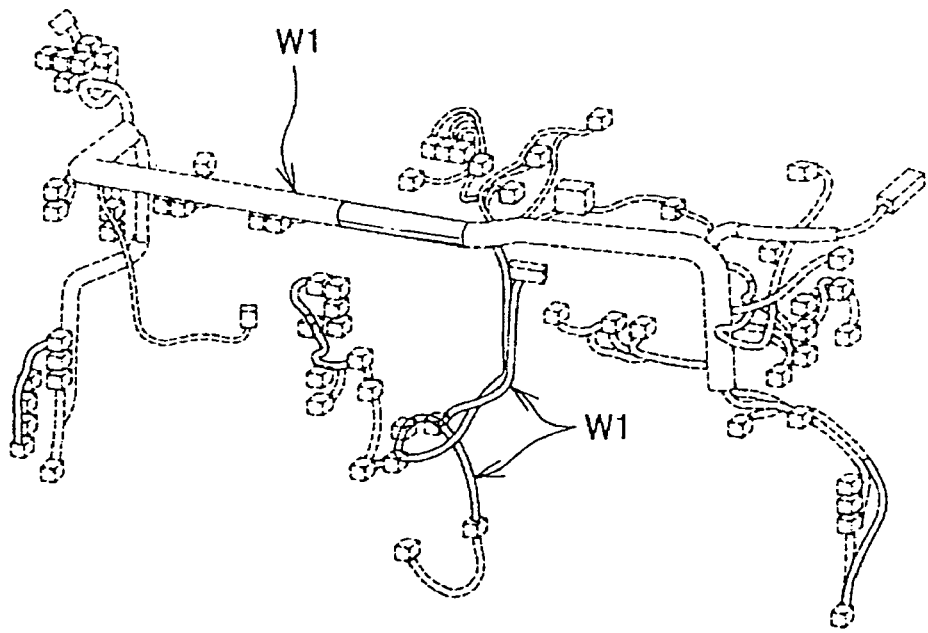
FIG. 4 is an explanatory diagram of a path plan indicated by path plan information.

An example of the path plan information D2 is arranged to include various data for displaying a three-dimensional shape and a path of the wire harness W1 forming the three-dimensional structure 2 as shown in FIG. 4, and is associated with the circuit information by a part number and such of the three-dimensional structure 2 and stored in the hard disk device and such as a path plan information database (DB).

In this embodiment, a configuration, a shape and a path and such of the three-dimensional structure 2 shown in FIG. 3 can be displayed by referring to the above-described circuit information D1 and the path plan information D2. That is, the above-described circuit information D1 and the path plan information D2 are designed by the vehicle manufacturer and are indicative of a mounting configuration model M2 used when the three-dimensional structure 2 is mounted at a body and such of the vehicle as a mount object. In another embodiment, the mounting configuration model M2 may be displayed by using only the path plan information D2.

Next, the manufacturing requirement information providing device 7 is provided at an arbitral location such as the parts manufacturer so the manufacturing requirement information providing device 7 can communicate with the planar manufacturing drawing production support device 10 and is performed by a computer and such. The manufacturing requirement information providing device 7, by executing an application program, transmits manufacturing requirement information D3 and such in response to a transmission request from the planar manufacturing drawing production support device 10. More specifically, the manufacturing requirement information providing device 7 preliminarily stores several kinds of the manufacturing requirement information D3. The manufacturing requirement information providing device 7 determines a size, a shape and a configuration and such of the three-dimensional structure 2 based on the acquired circuit information D1 and the acquired path plan information D2, selects the manufacturing requirement information D3 corresponding to the three-dimensional structure 2 from the preliminarily-stored several kinds of the manufacturing requirement information D3 and transmits to a requested destination.

An example of the manufacturing requirement information D3 is arranged to include manufacturing jig data indicative of a wiring board 8 (refer to FIG. 7) used in manufacture of the wire harness W1 and a jig and such as well as manufacturing requirement data for taking into account the rigidity of the wire harness W1 and the three-dimensional structure 2 when manufactured on the wiring board as well as the manufacturing requirements. As described above, the manufacturing requirement information D3 is arranged to include, in advance of the vehicle manufacturer releasing a drawing, various data for taking into account the rigidity of the wire harness W1 and the manufacturing requirements such as a layout condition used when laying out the three-dimensional structure 2 in a planar form during the manufacture. Or, the manufacturing requirement information D3 may be arranged arbitrarily.

As publicly known, the wiring board 8 is constituted of a board slanted such that a side thereof adjacent to a worker is arranged lower. The wiring board 8 includes a vertically arranged wiring jig and such, and the wire harness W1 is wired along the wiring jig. The wire harness W1 wired on the wiring board 8 corresponds to a layout configuration model M1 in which the three-dimensional structure 2 is laid out in a planar form. The layout configuration model M1 is not limited to the one laid out on the wiring board 8 but can be the one laid out at an arbitral place in a planar form.

Figure 5:
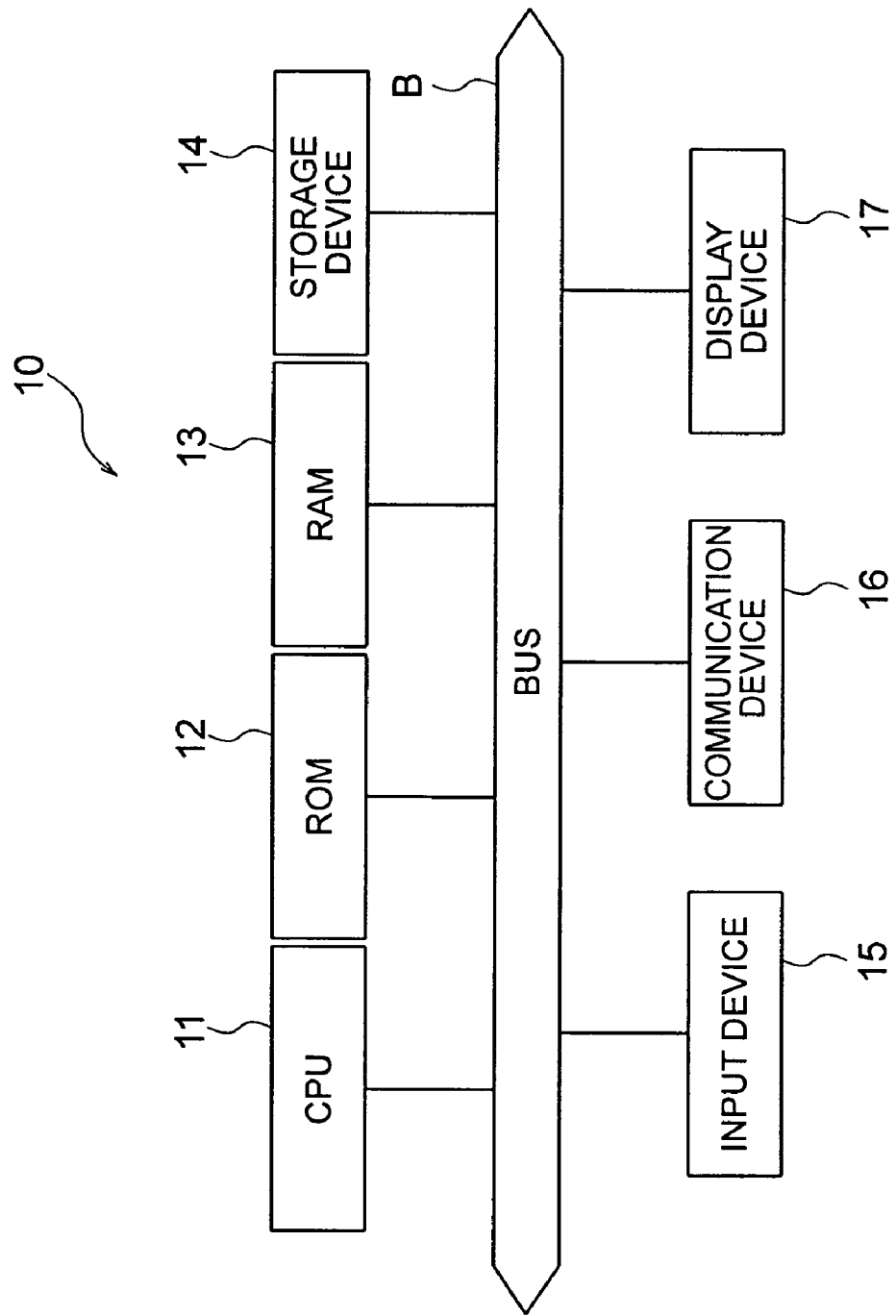
FIG. 5 is a configuration diagram showing one example of a schematic configuration of the planar manufacturing drawing production support device.

Next, the planar manufacturing drawing production support device 10 utilizes a known computer and includes, as shown in FIG. 5, a central processing unit (CPU) 11 controlling an operation of the entire device according to a predetermined program. The CPU 11 connects with, via a bus B, a ROM 12 as a read-only memory to which the program for the CPU 11 is stored and a RAM 13 as a random-access memory having a working region storing various data needed for processing the CPU 11.

Figure 6:
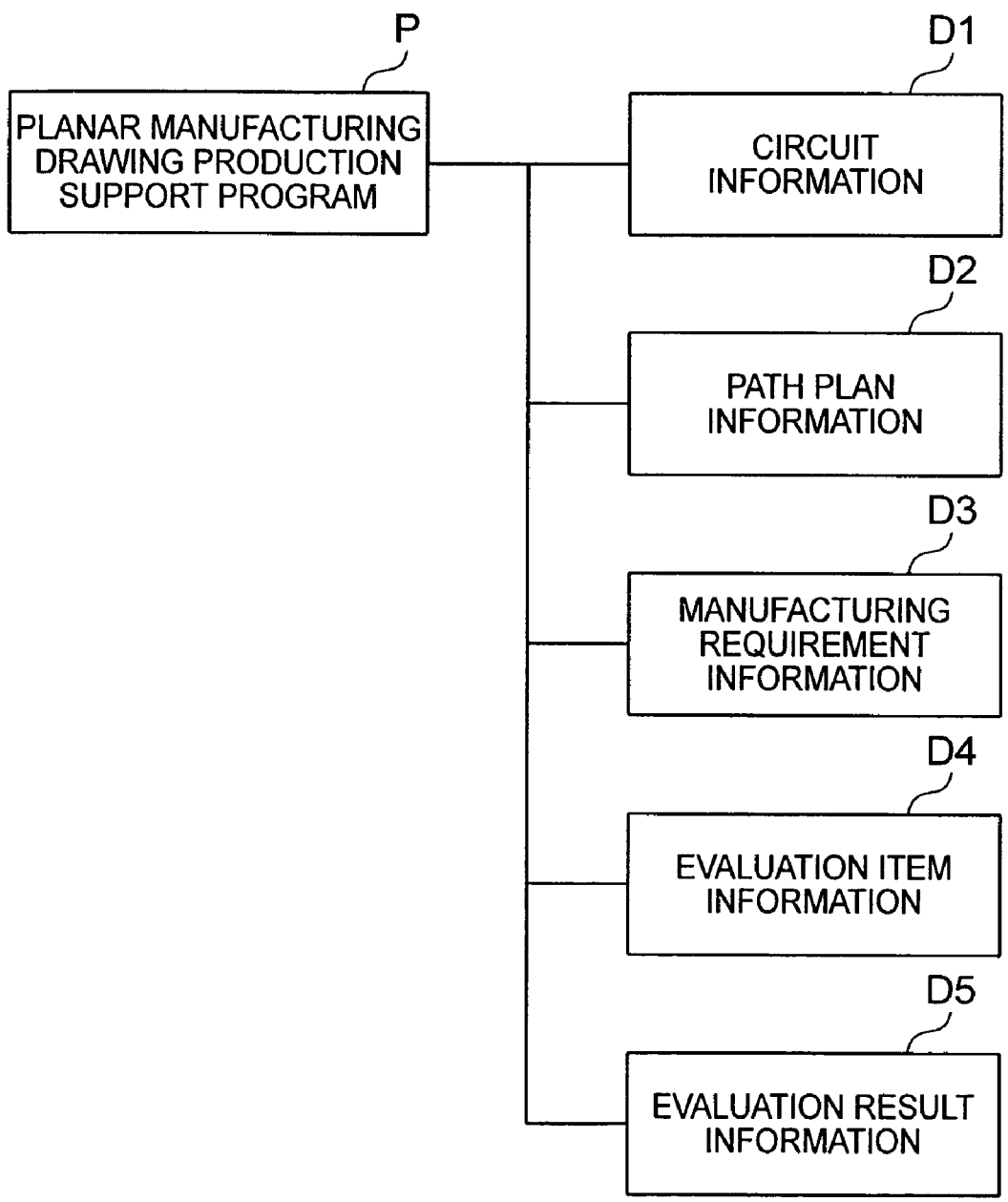
FIG. 6 is an explanatory diagram of one example of a program and a variety of information stored in a storage device shown in FIG. 5.

The CPU 11 connects with a storage device 14 via the bus B. A hard disk device or a large-capacity memory or the like is used as the storage device 14. The storage device 14 includes, as shown in FIG. 6, a storage region storing a variety of programs and a variety of information such as a planar manufacturing drawing production support program P, the circuit information D1, the path plan information D2, the manufacturing requirement information D3, evaluation item information D4 and evaluation result information D5. In addition, the planar manufacturing drawing production support program P and the evaluation item information D4 and such are installed for example from a CD-ROM or downloaded via a network and are stored in the storage device 14.

Figure 1:
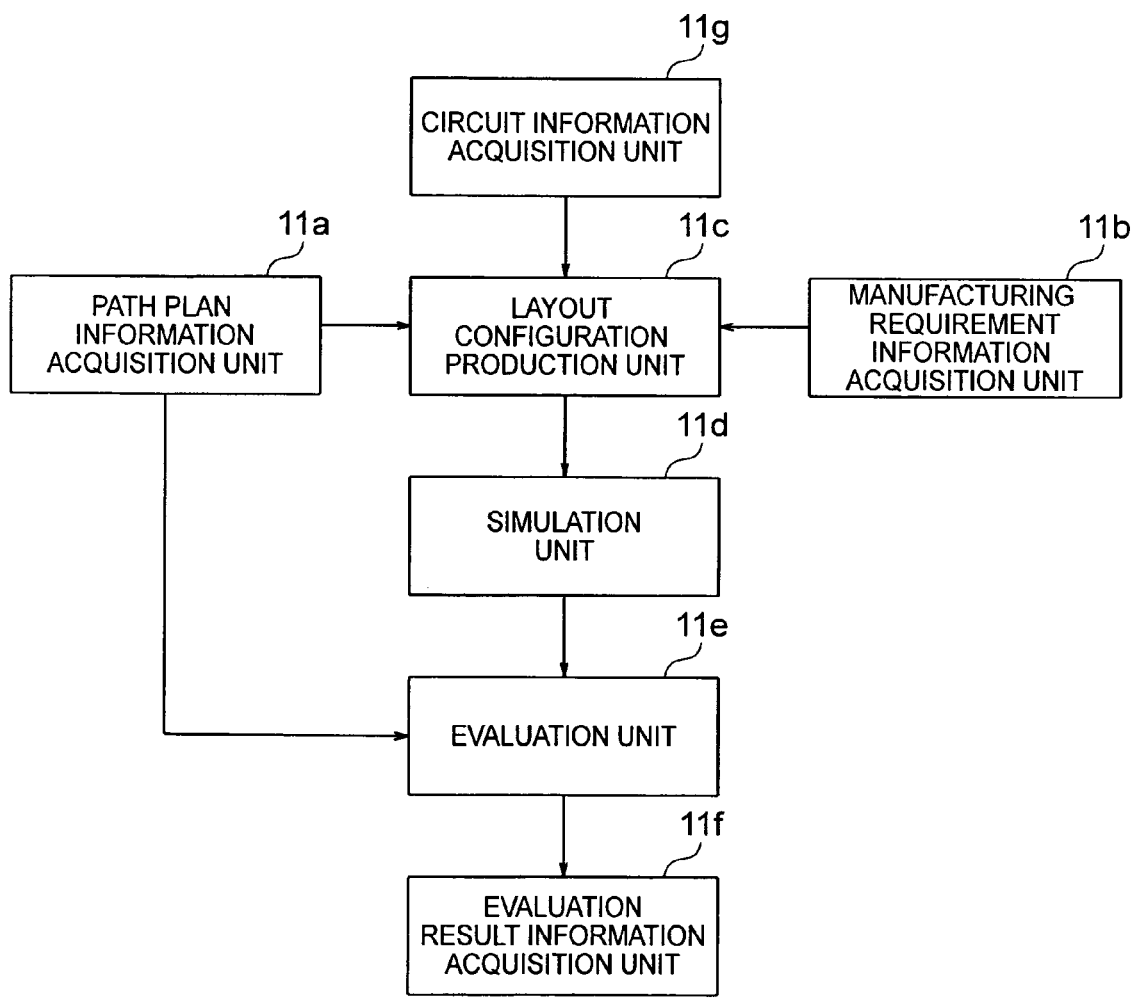
FIG. 1 is a configuration diagram showing a basic configuration of a planar manufacturing drawing production support device according to the present invention.

The planar manufacturing drawing production support program P causes the computer to function as a unit supporting production of the planar manufacturing drawing in which the three-dimensional structure 2 is laid out in a planar form based on the circuit information D1 indicative of a configuration of the three-dimensional structure 2 constituted of the plurality of wire harness W1 and the path plan information D2 indicative of a three-dimensional path plan of the wire harness W1 for the three-dimensional structure 2, in order to provide an instruction of manufacture of the three-dimensional structure 2 on the wiring board. The planar manufacturing drawing production support program P is operated to cause the CPU 11 to function as a path plan information acquisition unit 11*a*, a manufacturing requirement information acquisition unit 11*b*, a layout configuration production unit 11c, a simulation unit 11d, an evaluation unit 11e, an evaluation result information output unit 11f and a circuit information acquisition unit 11g, all of which are shown in FIG. 1. That is, the CPU 11 executes the planar manufacturing drawing production support program P and thereby functions as the various units described above.

The circuit information D1 and the path plan information D2 described above are acquired from the designing device 5 and stored in the storage device 14. The manufacturing requirement information D3 described above is acquired from the manufacturing requirement information providing device 7 and stored in the storage device 14. In addition, for the manufacturing requirement information D3, the variety of manufacturing requirement information D3 and a program for selection may be preliminarily stored in the storage device 14 such that appropriate manufacturing requirement information D3 can be selected as needed.

The evaluation item information D4 includes various evaluation item data such as an excess or deficiency of a length of the wire harness W1, a branching direction, a path based on the physical property of the wire harness W1 which result from transforming the three-dimensional structure 2 from the above-described layout configuration model M1, in which the three-dimensional structure 2 is laid out in a planar form, into the mounting configuration model M2, with which the three-dimensional structure 2 is mounted to the mount object. In addition the evaluation item information D4 can be arranged arbitrarily. In this embodiment, although the mounting configuration model M2 is the three-dimensional structure 2, however, the present invention is not limited to this, and the mounting configuration model M2 may be an arbitral portion such as a branching portion or a folding portion of the three-dimensional structure 2.

The evaluation result information D5 is arranged to include defect data for displaying a defect point and a detail of the defect corresponding to the evaluation item information D4 when the three-dimensional structure 2 indicated by the path plan information D2 is manufactured on the wiring board 8 in a planar form. In addition, the evaluation result information D5 may be arranged to indicate only the evaluation result, or may be arranged differently.

The CPU 11 connects with an input device 15, a communication device 16 and a display device 17 via the bus B. The input device 15 includes a keyboard and a mouse and outputs input data based on a user's operation to the CPU 11. The communication device 16 utilizes communication equipment such as a LAN card and a cell phone modem. In addition, the communication device 16 outputs the received information to the CPU 11 and transmits the information inputted from the CPU 11 to a requested destination.

For the display device 17, various display units such as a known liquid crystal display or a CRT may be used. In addition, the display device 17 is controlled by the CPU 11 and thereby displays a variety of information. That is, the display device 17 displays various screens indicative of the layout configuration model M1 and the evaluation result and such according to the variety of information described above.

Figure 8:
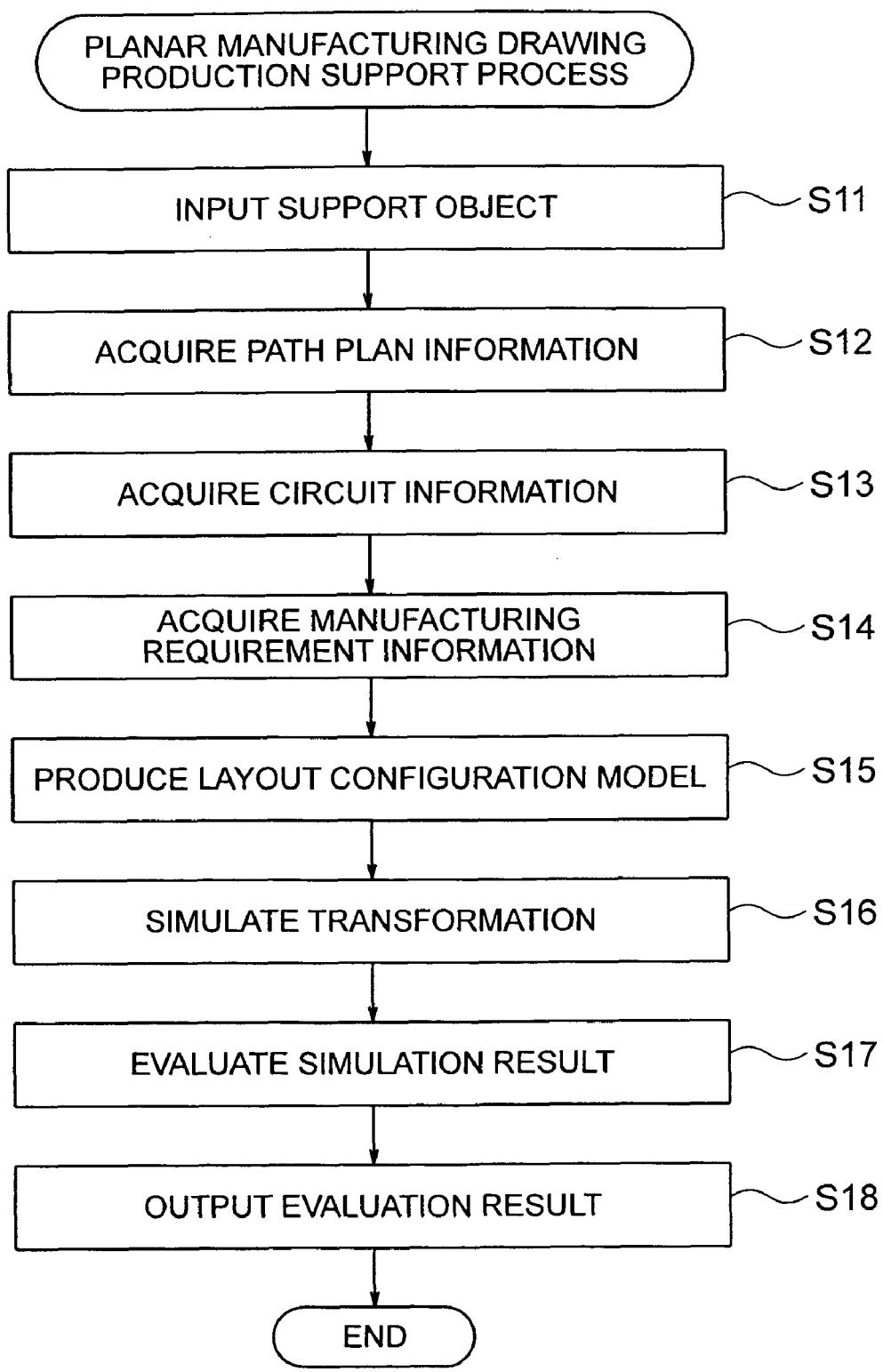
FIG. 8 is a flowchart showing one example of a planar manufacturing drawing production support process executed by a CPU shown in FIG. 5.

Next, with reference to a flowchart of FIG. 8, the following describes one example of a planar manufacturing drawing production support process performed by the CPU 11 executing the above-described planar manufacturing drawing production support program P.

When the CPU 11 executes the planar manufacturing drawing production support program P, in Step S11, the display device 17 displays an input screen for a user to input identification data for an identification of the three-dimensional structure 2 as a support object, and then the identification data inputted based on the input screen is acquired from the input device 15. Then, the process proceeds to Step S12.

In Step S12 (corresponds to the path plan information acquisition unit), the path plan information D2 corresponding to the identification data is acquired from the designing device 5 via communication and stored in the storage device 14. In Step S13 (corresponds to the circuit information acquisition unit), the circuit plan information D1 corresponding to the path plan information D2 is acquired from the designing device 5 via communication and is associated with the path plan information D2 and stored in the storage device 14. Then, the process proceeds to Step S14.

In Step S14 (corresponds to the manufacturing requirement information acquisition unit), when the path plan information D2 is transmitted to the manufacturing requirement information providing device 7 via the communication device 16, the manufacturing requirement information providing device 7 selects the manufacturing requirement information D3 which can be used for the path plan information D2 from the several kinds of the manufacturing requirement information D3 stored in the manufacturing requirement information providing device 7 and transmits to the planar manufacturing drawing production support device 10. Thus, the manufacturing requirement information D3 is received and stored in the storage device 14 via the communication device 16. In this manner, the manufacturing requirement information D3 is acquired from the manufacturing requirement information providing device 7. Then, the process proceeds to Step S15.

Figure 7:
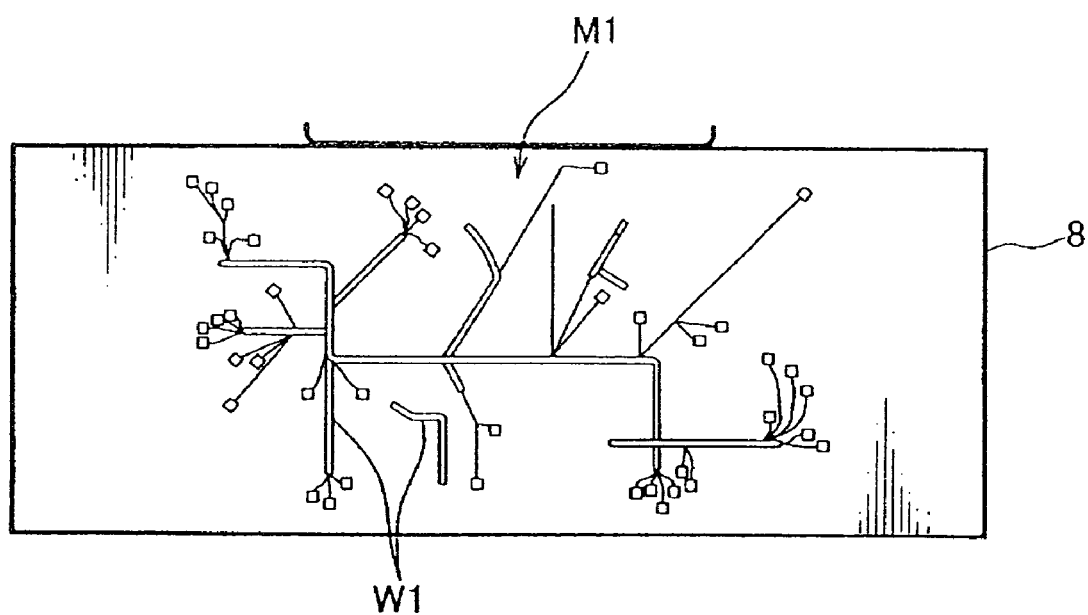
FIG. 7 is an explanatory diagram of one example of a layout configuration model.

In Step S15 (corresponds to the layout configuration production unit), based on the path plan information D2 and the circuit information D3 and the manufacturing requirement information D4, the layout configuration model M1 in which the three-dimensional structure 2 shown in FIG. 3 is laid out on the wiring board 8 in a planar form as shown in FIG. 7 is produced and stored in the storage device 14 as layout configuration model information indicative of the above-described layout configuration model M1. Then, the process proceeds to Step S16.

In an example for producing the layout configuration model M1, a branch point on the wire harness W1 is arranged in a planar form using a known technique such as a tangent expansion or a planar expansion so that the distortion of the wire harness W1 is minimized and that various manufacturing requirements of the wiring board 8 and the wiring jig and such are taken into account. In addition, the expansion techniques are described in detail for example in Japanese Patent Application Publication No. 2004-22188, Japanese Patent Application Publication No. 2004-119134 and Japanese Patent Application Publication No. 2004-362542.

In Step S16 (corresponds to the simulation unit), the evaluation item information D4 is acquired from the storage device 14, and a simulation program preliminary stored in the storage device 14 is executed to simulate, according to evaluation items or evaluation points indicated by the evaluation item information D4, a transformation from the produced layout configuration model M1 described above (refer to FIG. 7) to the mounting configuration model M2 (refer to FIG. 3) indicated by the circuit information D1 and the path plan information D2, and a simulation result is stored in the storage device 14. Then, the process proceeds to Step S17.

In Step S17 (corresponds to the evaluation unit), an evaluation is performed by comparing the simulation result of the storage device 14 with a criterion indicated by the evaluation item information D4, and an evaluation result is associated with the path plan information D2 and such and stored in the storage device 14. Then, in Step S18 (corresponds to the evaluation result information output unit), evaluation result information is produced from the evaluation result, and the evaluation result information is outputted to other devices via the display device 17 and the communication device 16 in order to support at least one of designing of a path of the three-dimensional structure 2 and production of the planar manufacturing drawing. Then, the process ends.

Figure 9:
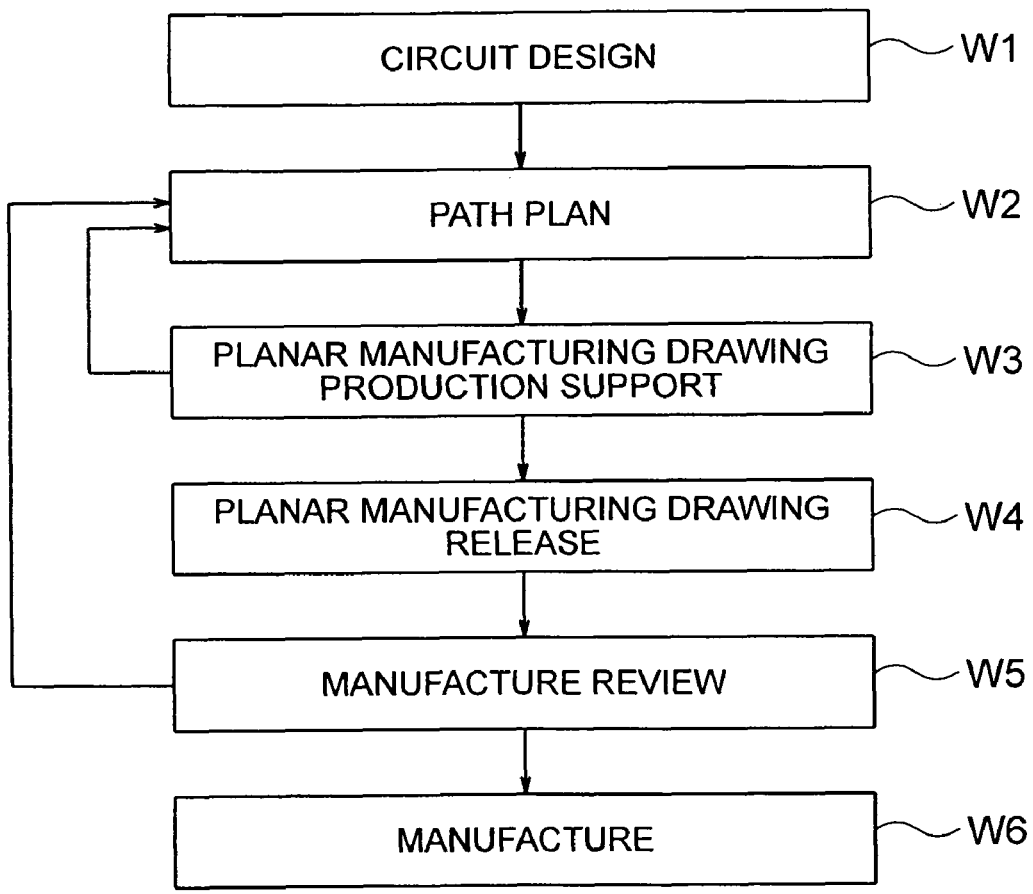
FIG. 9 is an explanatory diagram of one example of a workflow using the planar manufacturing drawing production support device.
Figure 10:
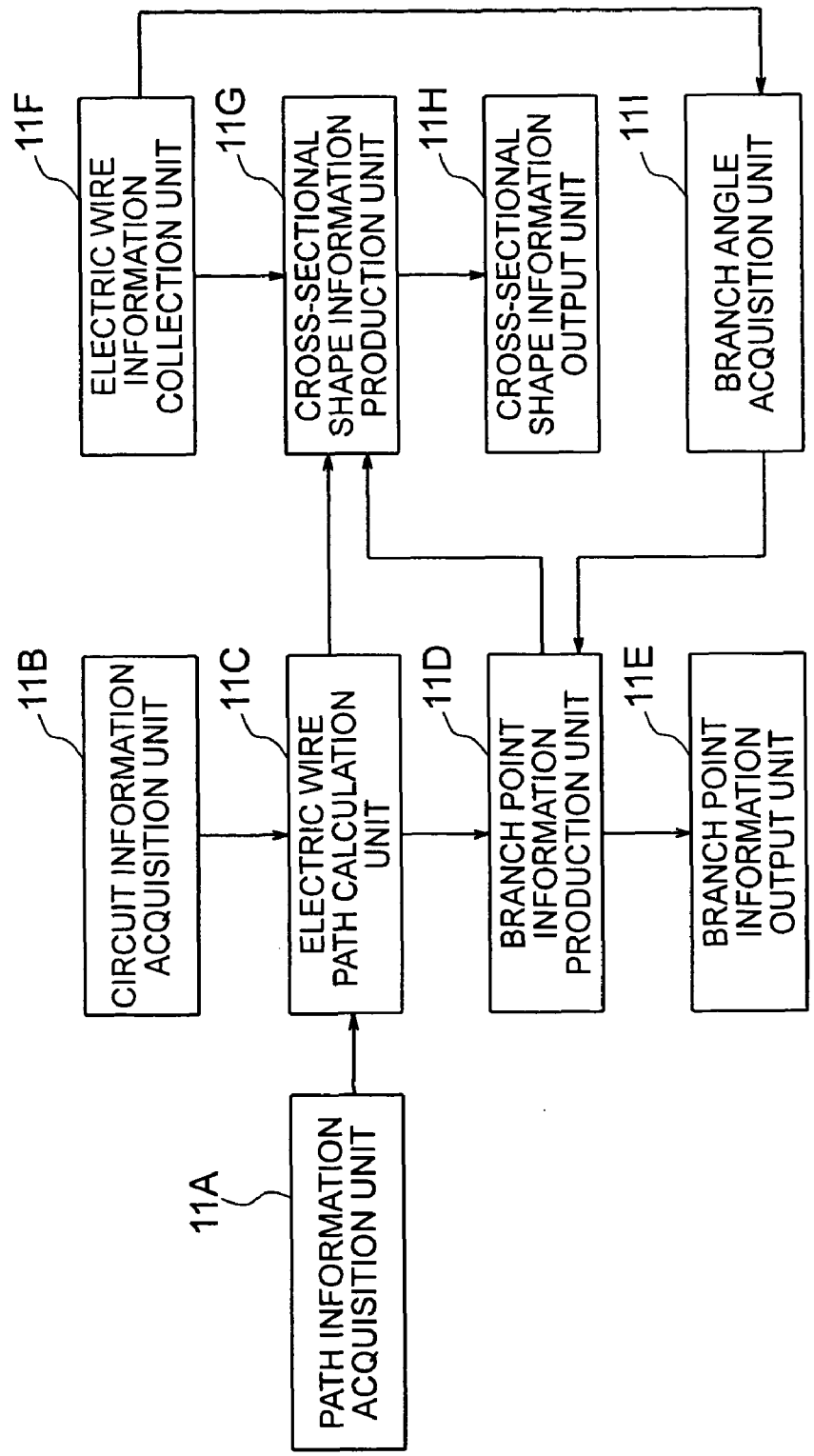
FIG. 10 is a configuration diagram showing a basic configuration of a branch angle design support device according to the present invention.

Next, referring to FIG. 9, the following describes one example of an operation (action) relating to a workflow from a designing process to a manufacturing process of the three-dimensional structure 2 in the above-described three-dimensional structure designing system 1.

In response to a requirement from a designer corresponding to a completion of a designing of a mount object such as a motor vehicle, the designing device 5, while taking into account the supplemental equipment and a fixation position thereof as well as a shape of a body, designs a circuit and produces the circuit information D1 (W1), plans a path of the circuit and produces the path plan information D2, and then associates the circuit information D1 and the path plan information D2 with each other and stores the circuit information D1 and the path plan information D2 (W2).

The planar manufacturing drawing production support device 10 activated by the designer acquires, as described above, the circuit information D1, the path plan information D2 and the manufacturing requirement information D3 from the designing device 5 or the manufacturing requirement information providing device 7, and according to these information, produces the layout configuration model M1 shown in FIG. 7. Then the planar manufacturing drawing production support device 10 simulates a transformation from this layout configuration model M1 to the mounting configuration model M2 shown in FIG. 3, performs the evaluation of the evaluation items based on the simulation results and the evaluation item information D4, and outputs the evaluation result information indicative of the evaluation result to the display device 10, thereby displaying the evaluation result to the display device 10 to the designer (W3).

The designer refers to the evaluation result, and if there is any defect point at which the three-dimensional structure 2 manufactured on the wiring board 8 fails to be mounted to the mount object, the designer returns back to the path planning process (W3), performs a design change of the path plan information D2 for the defect point and then performs once again the planar manufacturing drawing production support process (W4). If there is no defect point in the evaluation result, then the designer releases the planar manufacturing drawing. Then, the vehicle manufacturer provides an instruction of manufacture of the three-dimensional structure 2 to the parts manufacturer with the planar manufacturing drawing (W4).

The parts manufacturer, according to the above-described planar manufacturing drawing, reviews the wiring board 8, the manufacturing jig and the jig layout and such and reviews a production of a vehicle feasibility evaluation and such. If any defect is found in a result of the review, the parts manufacturer notifies the defect information to the vehicle manufacturer. Accordingly, the designer performs a design change of the path plan information D2 for that defect point (W3) and performs once again the series of processes from after the planar manufacturer drawing production support process. If no defect is found in the result of the review of the process W5, the three-dimensional structure 2 instructed to manufacture is manufactured on the wiring board 8 in a planar form (W6).

According to the planar manufacturing drawing production support system 10 described above, by acquiring the path plan information D2 and the manufacturing requirement information D3, the layout configuration model M1 based on the manufacture requirements is produced, and the evaluation is performed according to the simulation result obtained from the transformation to the mounting configuration model M2, and the evaluation result is outputted to support at least one of the designing of the path of the three-dimensional structure 2 and the production of the planar manufacturing drawing. Therefore, factors which cause the design change can be reduced at a time of production of the path plan information D2 before production of the planar manufacturing drawing. Therefore, an accuracy of the planar manufacturing drawing produced according to the path plan information D2 can be improved, thereby reducing generation of defects during the manufacturing process. Consequently, a transition from the designing process to the manufacturing process can be attained efficiently. Furthermore, the number of reviewing processes in the manufacturing process can be reduced and mock-ups of the manufacturing jigs can be efficiently dumped, thereby shortening a lifecycle of the three-dimensional structure 2.

Furthermore, the circuit information D1 of the three-dimensional structure 2 is acquired and so the layout configuration model M1 is produced based on the circuit information D1, the path plan information D2 and the manufacturing requirement information D3. Therefore, a direction and such of a connector to be connected to the wire harness can be taken into account, thus the simulation of the transformation from the layout configuration model M1 to the mounting configuration model M2 can be performed even more accurately. Consequently, a quality of a final planar manufacturing drawing produced according to the path plan information D2 can be improved even more, reducing generation of the design changes.

In the above-described embodiment, the designing device 5, the manufacturing requirement information providing device 7 and the planar manufacturing drawing production support device 10 are performed in separate devices, however, the present invention is not limited to this, and can be performed in other various embodiments. For example, all the application programs may be installed in the designing device 5 to be performed by one device, or the designing device 5 and the planar manufacturing drawing production support device 10 may be performed as one device.

Next, designing of the wire harness proceeds concurrently with designing of the vehicle and such to which the wire harness is wired. In general, in a path layout of the wire harness, the manufacturer of the vehicle and such (simply called the vehicle manufacturer) provides a request, and then the parts manufacturer receiving the request manufactures the wire harness which satisfies the request using manufacturing jigs. In addition, a patent literature (Japanese Patent Application Publication No. 2004-46815) describes a design support system for a wire harness responding appropriately to frequently-generating design changes and improving a designing efficiency of a wiring board layout and a path layout proposal accompanying thereto.

Figure 18:
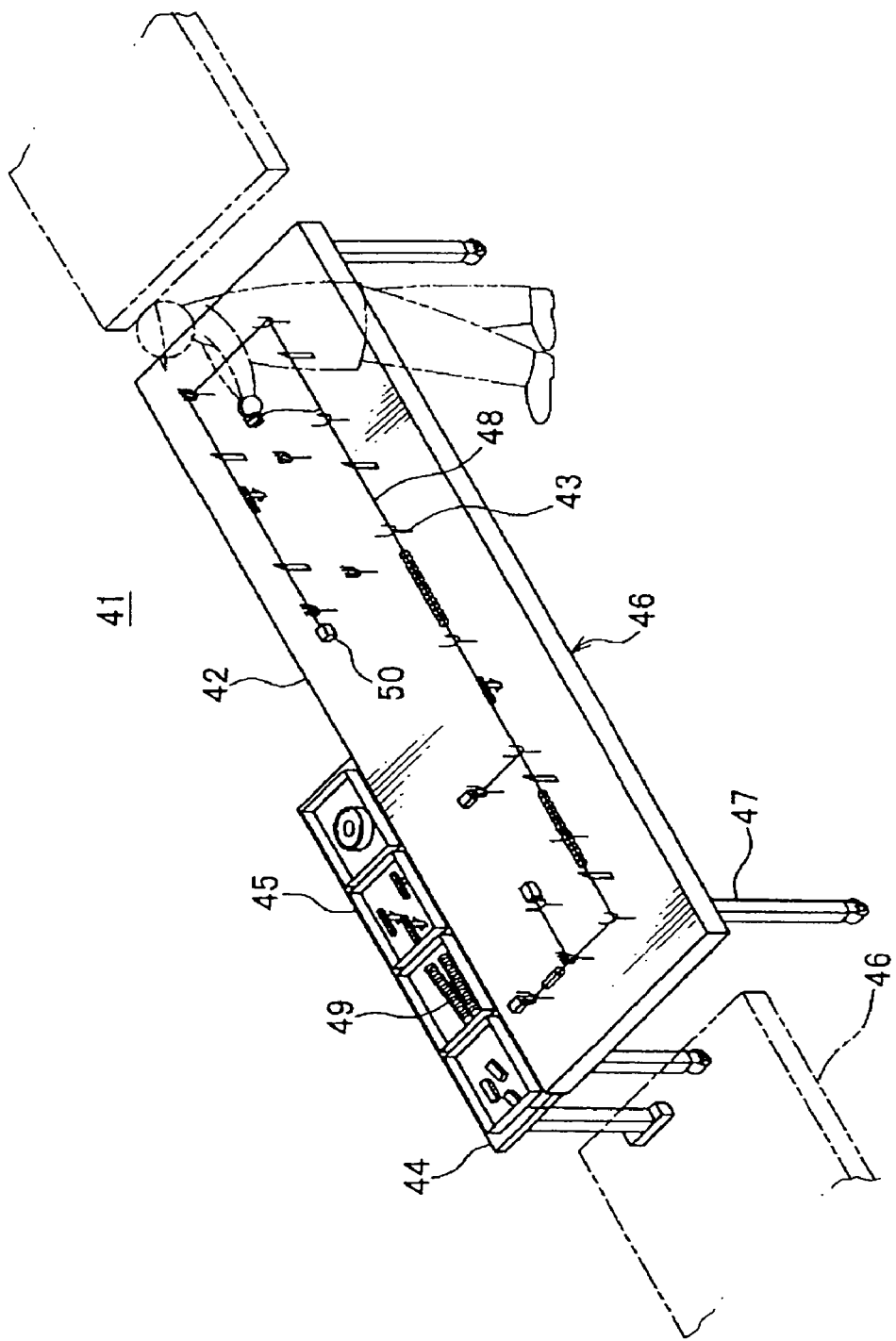
FIG. 18 is a diagram showing one embodiment of a wiring device using conventional wiring jigs.
Figure 19:
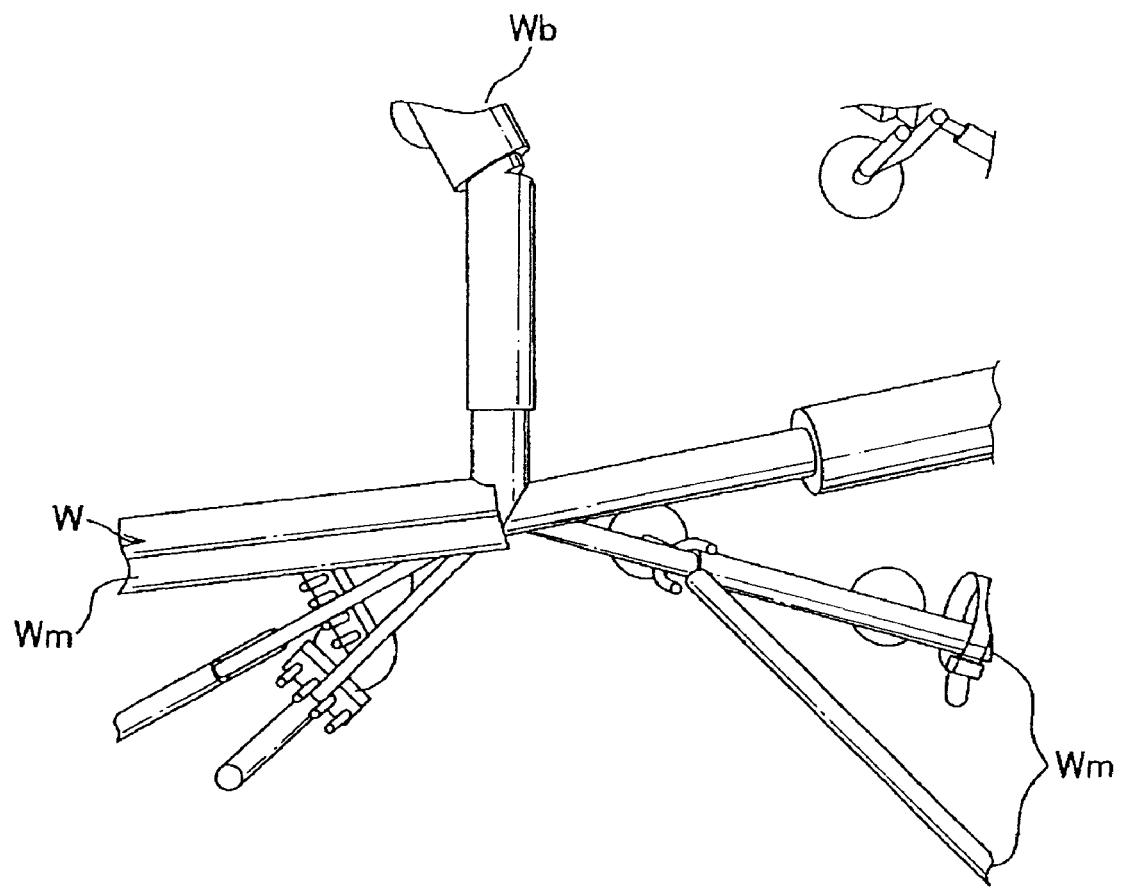
FIG. 19 is a diagram for explaining a problem in a conventional wire harness.

In addition, FIG. 18 shows one embodiment of a conventional wire harness manufacturing jig (refer to the above-described patent literature).

The above-described manufacturing jig 41 includes at least a wide, rectangular basal board 42, a plurality of wiring jigs 43 vertically arranged on the basal board 42, a parts shelf 44 arranged adjacent to the basal board 42 and a parts case 45 on the parts shelf 44. A wiring board 46 is constituted of the basal board 42 and the plurality of wiring jigs 43.

The wiring board 46 is supported by legs 47 in a slanted manner. By doing so, the worker can easily and efficiently wire an electric wire 48 with respect to the wiring board 46 having a large depth. In a case in which the wiring board 46 is not arranged in a slanted manner, the worker cannot reach to a back side of the wiring jig 43, causing decrease in work efficiency. Meanwhile, the wiring board having a small depth is not arranged in a slanted manner but in a horizontal manner.

The term wiring corresponds to respectively wiring the electric wires 48 in a required form along the wiring jigs 43. The plurality of electric wires 48 wired is provided with parts such as a protective tube 49 and a protector attached thereto. A terminal (not shown) is clamped to an end of the each electric wire 48, and the respective terminals are inserted into a connector housing. The connector housing and the terminal together constitute a connector 50. Furthermore, the plurality of electric wires 48 is bonded together with a vinyl tape 51, constituting a wire harness 52.

When designing the above-described wire harness, if an application software such as CAD (computer aided design) is used, a wire harness W is represented in a bundled manner, thus the number of the electric wires (circuits) cannot be taken into account. Therefore, for example an inexperienced designer finds it difficult to adequately design a branch angle θ of a branch wire Wb branching from a main wire Wm.

Therefore, if the branch angle θ is designed in a stressful manner, a corresponding portion becomes difficult to bend, causing a problem of reduction in an assembling efficiency. In addition, if the wire harness W is designed with an angle with a large stress, a corresponding branching portion is subjected to stress, causing a reduction in durability of the wire harness W. Furthermore, since it is difficult to determine whether or not the branch angle θ for the wire harness W is arranged in a stressful manner until the actual manufacture, many design changes were needed during manufacturing. Therefore, there was a problem that a start in the manufacture falling behind a schedule.

Accordingly, in view of the above-described problems, the present invention provides a branch angle designing support device which can improve an assembling efficiency and a durability of the wire harness.

Referring now to FIG. 11 through FIG. 17, the following describes an embodiment for supporting designing of a branch angle at a branch point on the above-described wire harness when laying out the wire harness (W/H) constituted of a plurality of electric wires bundled together forming the three-dimensional structure in a planar layout configuration.

Figure 11:
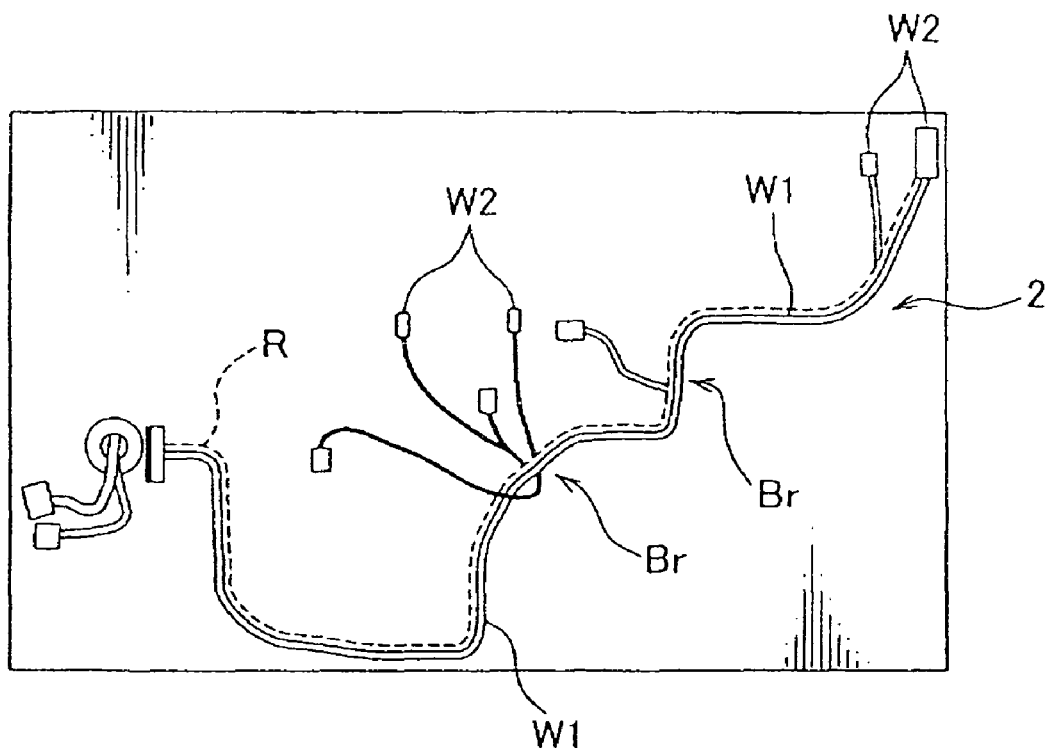
FIG. 11 is an explanatory diagram of an example of a three-dimensional structure and a wire harness.
Figure 14:
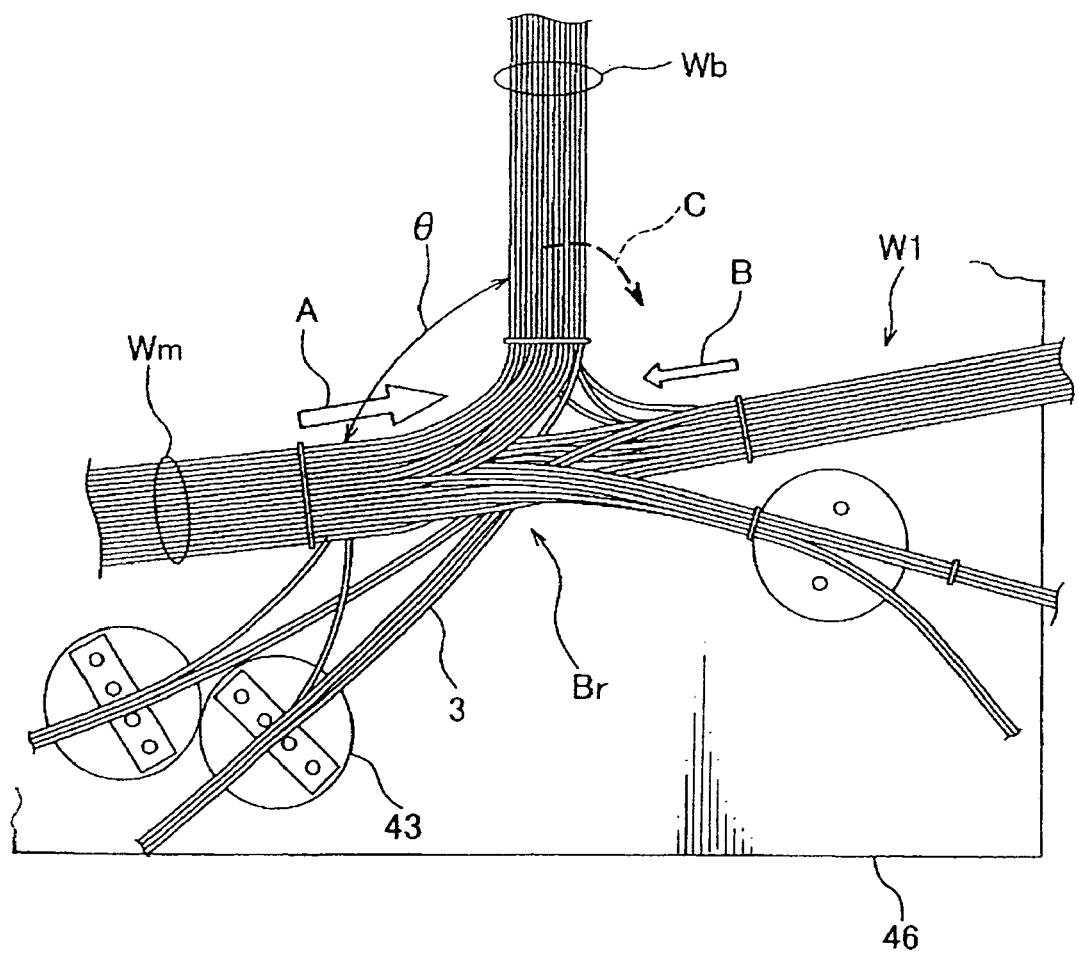
FIG. 14 is an explanatory diagram of one example of design support of a branch angle.

In FIG. 11, a three-dimensional structure 2 includes a wire harness W1 constituted of a plurality of electric wires (a bundle of electric wires) 3 shown in FIG. 14 and a connector W2 provided for example at an end of the wire harness W1. The electric wire 3 includes, as known, a conductive core wire and a cover portion made of an insulating synthetic resin and covering the core wire. The connector W2 includes a conductive terminal clamp and an insulating connector housing. In FIG. 2, a dotted line indicates an electric path R of one electric wire (for example a main wire), and the electric path R is arranged by focusing on one or more electric wires 3.

Figure 12:
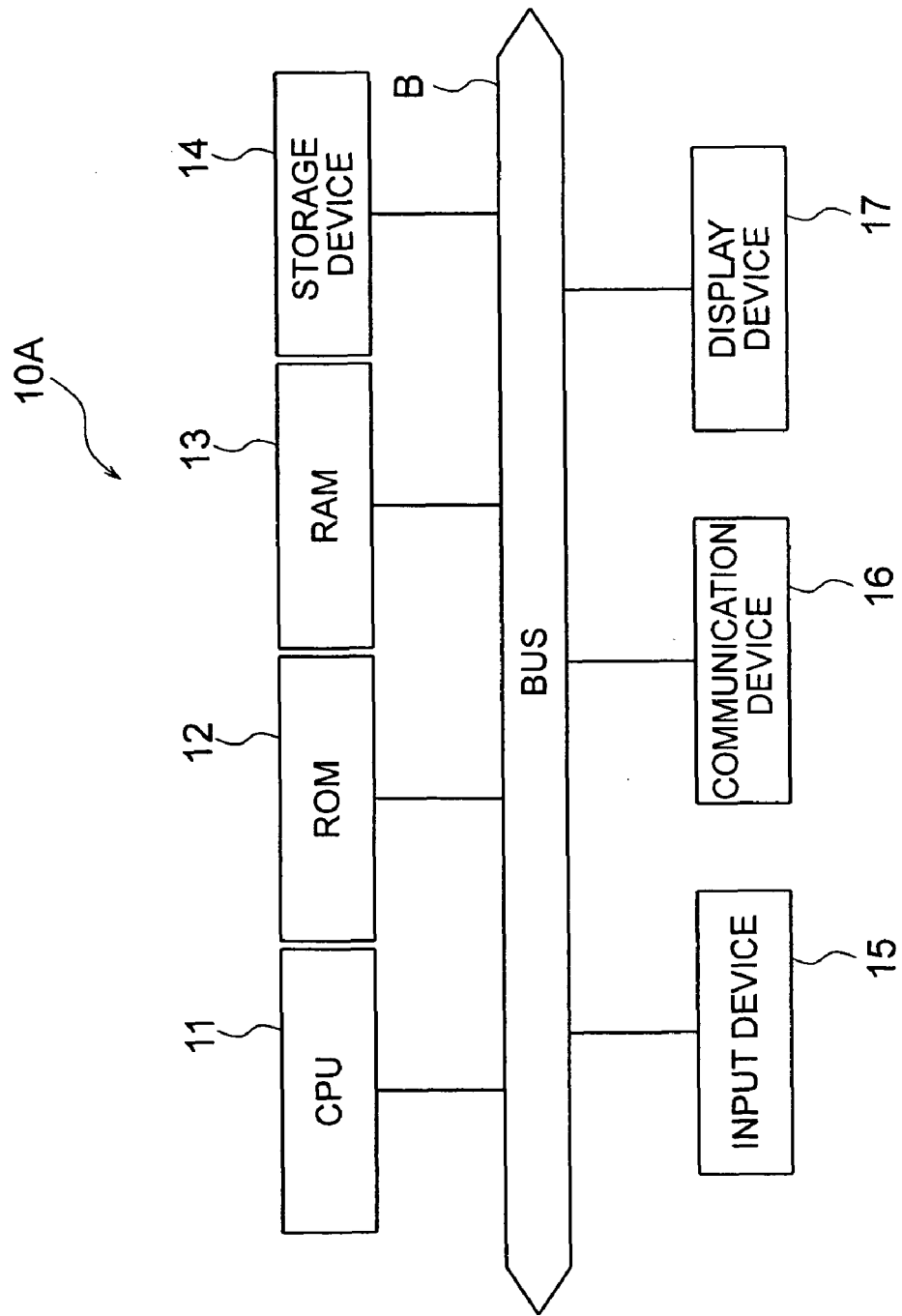
FIG. 12 is a configuration diagram showing a schematic diagram of the branch angle design support device.

In FIG. 12, a branch angle designing support device 10A utilizes a known computer and includes a central processing unit (CPU) 11 controlling an operation of the entire device according to a predetermined program. The CPU 11 connects with, via a bus B, a ROM 12 as a read-only memory to which a program for the CPU 11 is stored and a RAM 13 as a random-access memory having a working region storing various data needed for processing the CPU 11.

Figure 13:
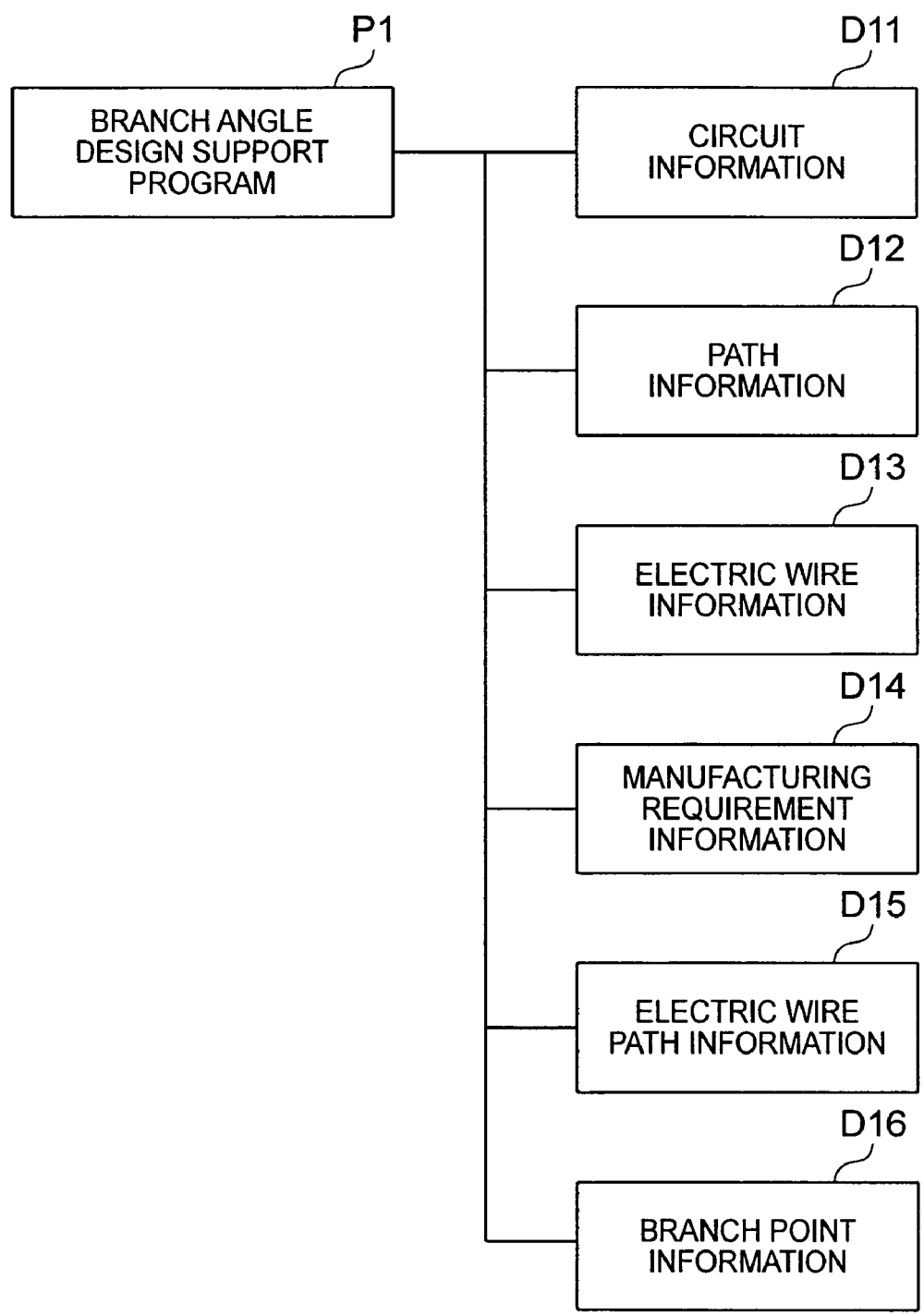
FIG. 13 is an explanatory diagram of one example of a program and a variety of information stored in a storage device shown in FIG. 12.

The CPU 11 connects with a storage device 14 via the bus B. A hard disk device or a large-capacity memory or the like is used as the storage device 14. The storage device 14 includes, as shown in FIG. 13, a storage region storing a variety of programs and a variety of information such as a branch angle designing support program P1, circuit information D11, path information D12, electric wire information D13, manufacturing requirement information D14, electric wire path information D15 and branch point information D16. These are installed for example from a CD-ROM or downloaded via a network and are stored timely in the storage device 14.

The branch angle designing support program P1 is executed to cause, when laying out the wire harness W1 constituted of a bundle of electric wires forming the three-dimensional structure 2 in a planar layout configuration, the CPU (computer) 11 of the branch angle designing support device 10A for supporting designing of the branch angle at the branch point on the wire harness W1 function as: a path information acquisition unit 11A acquiring path information D12 indicative of a path of the wire harness W1; a circuit information acquisition unit 11B acquiring circuit information D11 indicative of a circuit of the wire harness W1; an electric wire path calculation unit 11C which associates, according to respective ends of the plurality of electric wires 3, the path information D12 acquired by the path information acquisition unit 11A with the circuit information D11 acquired by the circuit information acquisition unit 11B and thereby calculates, according to the associated information, an electric wire path of each of the plurality of electric wires 3 in the planar layout; a branch point information production unit 11D producing, according to the plurality of electric wire paths calculated by the electric wire path calculation unit 11C, branch point information for displaying the flow of the respective electric wires 3 at the branch point on the wire harness W1; and a branch point information output unit 11E outputting the branch point information produced by the branch point information production unit 11D in order to support designing of the branch angle. That is, the CPU 11 executes the branch angle designing support program P and thereby functions as the variety of units described above.

An example of the circuit information D11 is arranged to include various data such as a type of the wire harness W1, constitution of the electric wire 3, a size, a connection point of the wire harness W1 (From-To) and a name of the connector W2 to be attached to an end (for example, an air conditioner or a door) and is stored in the storing device 14 and such a as circuit information database (DB).

An example of the path information D12 is arranged to include various data for indicating a three-dimensional or a two-dimensional shape and a path of the wire harness W1 forming the three-dimensional structure 2. In addition, the path information D12 includes name data of the electric wire 3 to be connected to the circuit information D11, and, using the name of the end portion thereof as a key, the circuit information D11 and the path information D12 are linked with each other. The path information D12 described above is associated with the circuit information D11 by a part number and such of the three-dimensional structure 2 and is stored in the storage device 14 and such as the path information database (DB).

The electric information D13 is provided in correspondence with a type and a part number of the electric wire 3 and is, for example, arranged to include a variety of data such as a diameter, a material, the rigidity and a color of a surface (cover portion) of the electric wire 3. This electric wire information D13 is associated by a constitution and such of the electric wire 3 indicated by the circuit information D11 and stored in the storage device 14 and such as an electric information database (DB).

In this embodiment, for simplicity, the above-described circuit information D11, the path information D12 and the electric wire information D13 are preliminarily stored in the storage device 14; however, the present invention is not limited to this, and, for example, the above-described circuit information D11, the path information D12 and the electric wire information D13 may be arranged as a database in an external hard disk drive which can be accessed via an internet or a LAN or the like.

The manufacturing requirement information D14 is arranged to include manufacturing jig data indicative of the wiring board 46 (refer to FIG. 18) and a wiring jig and such used in manufacture of the wire harness W1 and manufacturing requirement data for taking into account the rigidity of the wire harness W1 and the three-dimensional structure 2 when manufactured on that wiring board and the manufacturing requirements. In this manner, the manufacturing requirement information D14 is arranged to include, before the vehicle manufacturer releases a drawing, the various data for taking into account the manufacturing requirements of the three-dimensional structure 2 instructed to manufacture and the rigidity of the wire harness W1.

The electric wire path information D15 associates the circuit information D11 and the path information D12 with each other based on the respective ends of the plurality of electric wires 3 and thereby indicates a result obtained by calculating the electric wire path of each of the plurality of electric wires 3 in the planar layout. In addition, the planar layout corresponds to a layout in which the three-dimensional structure 2 is laid out on the wiring board 46 in a planar manner.

The branch point information D16 is for displaying the flow of the respective electric wires 3 at the branch point Br of the wire harness W1. Or, the branch point information D16 may be arranged arbitrarily, for example, as shown in FIG. 14, the branch point information D16 may be partial information of enlarged one or more branch points Br or information indicative of the entire planar layout.

FIG. 14 is a partial enlarged view of the wiring board 46. The plurality of wiring jigs 43 are provided on the wiring board 46 so as to correspond with the planar layout configuration of the three-dimensional structure 2. The wire harness W1 is manufactured while being held by the wiring jigs 43. That is, the planar layout configuration is a layout configuration in which the three-dimensional structure 2 is wired on the wiring board 46 and laid out in a planar manner. In addition, an exemplary display of the wire harness W1 shown in FIG. 14 may be arranged such that a color of the each cover material of the electric wire 3 constituting the wire harness W1 are displayed realistically to allow the user to recognize the flow of the electric wire 3 even more accurately.

Furthermore, the wire harness W1 includes a main wire Wm and a branch wire Wb branching from the main wire Wm. The branch wire Wb bends at the branch point Br on the main wire Wm at the branch angle $\theta$. That is, the branch angle designing support device 10A supports designing of that branch angle $\theta$.

The CPU 11 connects with an input device 15, a communication device 16 and a display device 17 and such via the bus B. The input device 15 includes a keyboard and a mouse and outputs input data corresponding to the user's operation to the CPU 11. The communication device 16 utilizes communication equipment such as a LAN card and a cell phone modem. In addition, the communication device 16 outputs received information to the CPU 11 and transmits information inputted from the CPU 11 to a requested destination.

For the display device 17, various display units such as a known liquid crystal display or a CRT may be used. In addition, the display device 17 is controlled by the CPU 11 and thereby displays a variety of information. That is, the display device 17 supports designing of the branch angle $\theta$ for a designer by displaying the variety of screens indicative of the branch point information 16 and such based on the above-described variety of information. In addition, a method of outputting the branch point information 16 may include outputting the branch point information 16 from the CPU 11 to a printer and printing out the branch point information 16 on a paper, or other embodiments are possible.

Figure 15:
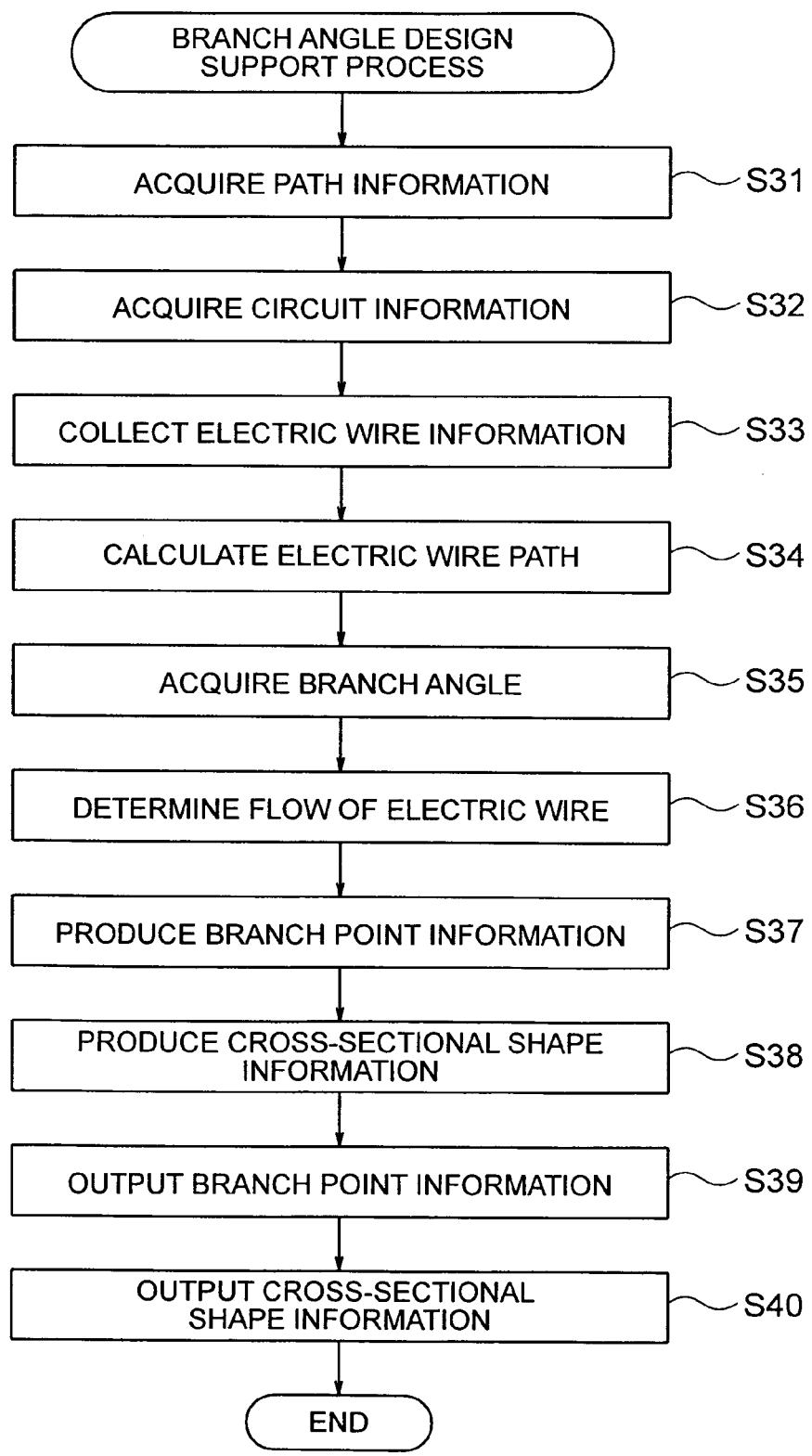
FIG. 15 is a flowchart showing one example of a branch angle design support process executed by a CPU shown in FIG. 12.

Next, the following describes, with reference to a flowchart of FIG. 15, one example of a branch angle designing support process when the CPU 11 executes the above-described branch angle designing support program P1.

When the branch angle designing support program P1 is executed by the CPU 11, the path information D12 corresponding to the three-dimensional structure 2 assigned by the designer is acquired from the storage device 14 and stored in the RAM 13 in Step S31 (corresponds to the path information acquisition unit), and the circuit information D11 corresponding to that three-dimensional structure 2 is acquired from the storage device 14 and stored in the RAM 13 in Step S32 (corresponds to the circuit information acquisition unit). Then, the process proceeds to Step S33.

In Step S33 (corresponds to the electric wire information collection unit), according to the acquired path information D12 and the acquired circuit information D11, the electric wire information D13 corresponding to each of the plurality of electric wires 3 is collected from the storage device 14 and stored in the RAM 13. Then, in Step S34 (corresponds to electric wire path calculation unit), according to the respective ends of the plurality of electric wires 3, the path information D12 and the circuit information D11 stored in the RAM 13 are associated with each other. Then, according to the associated information, the respective electric wire paths of the plurality of electric wires 3 at the planar layout is calculated, and a result of the calculation is stored in the storage device 14 as the electric wire path information D15. Then, the process proceeds to Step S35.

In Step S35 (correspond to the branch angle acquisition unit), according to the path information D12 and the circuit information D11, the each branch angle $\theta$ at the branch point Br for the predetermined path is acquired, associated with the branch point Br and stored in the RAM 13. Then, in Step S36, the flow of the each electric wire 3 passing through the branch point Br is determined according to the circuit information D11 for the respective branch points Br, and a diameter and a shape and such of the each electric wire 3 is determined according to the electric wire information D13, and then course data is produce by determining a course through which each of the electric wires 3 branching at the branch angle $\theta$ at the branch point Br extends. Then, the process proceeds to Step S37.

In addition, in a method for determining a course of the branching electric wire 3, a course of the each electric wire 3 is determined according to a size (a diameter) and the rigidity of the electric wire 3 as well as a conversion table predetermined for the corresponding branch angle $\theta$. More specifically, for example, a relative distance from the branch point corresponding to the diameter of the electric wire 3 is set in advance to determine so the electric wire 3 having the large diameter extends through an outer course and the electric wire 3 having smaller diameter extends through an inner course.

Figure 16:
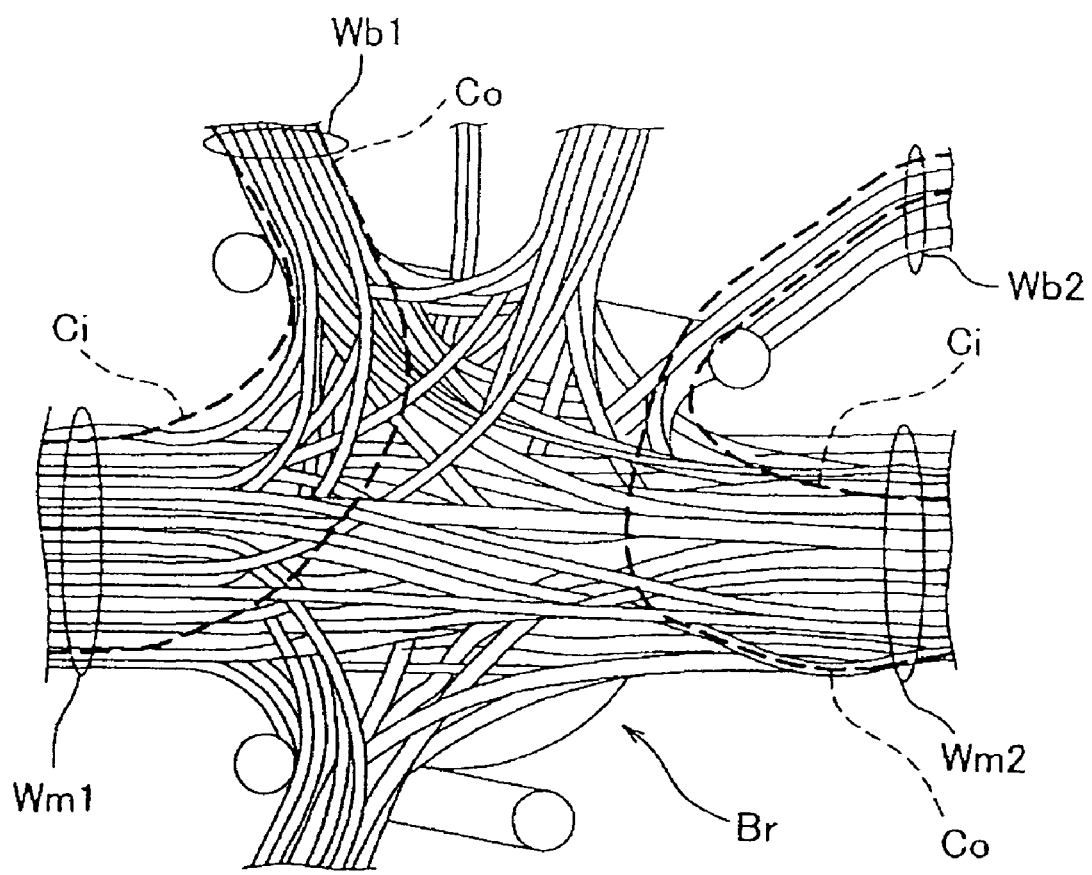
FIG. 16 is an explanatory diagram of another example of the design support of the branch angle.

In Step S37 (corresponds to the branch point information production unit), according to the determined flow, a diameter and a shape of the electric wire 3 and the plurality of calculated electric wire paths, the branch point information D16 for displaying the each flow of the plurality of electric wires 3 at the branch point Br of the wire harness W1 is produced so as to superposingly display the above-described course data and stored in the storage device 14. Then, the process proceeds to Step S38. In addition, for example as shown in FIG. 16, for the branch point information D16, the electric wires 3 are displayed in a manner such that the electric wires 3 extending through the branch wire Wb branching from the main wire Wm at the branch point Br are bundled in one. Also, the main wire Wm and the branch wire Wb can be viewed from a desired direction by a function for changing a viewpoint of a screen.

In Step S38 (corresponds to a cross-sectional shape information production unit), for an arbitrarily determined portion for the branch point Br in the branch point information D16, cross-sectional shape information D17 (refer to FIG. 17) indicative of a cross-sectional shape of the each bundle of electric wires of the main wire Wm or the branch wire Wb is produced, associated with the branch point information D16 and then stored in the storage device 14. Then, the process proceeds to Step S39.

In Step S39 (corresponds to the branch point information output unit), by outputting the above-described branch point information D16 to the display device 17, the branch point information D16 is displayed on the display device 17. In Step S40 (corresponds to a cross-sectional shape information output unit), by outputting the cross-sectional shape information D17 associated with the displayed branch point information D16 to the display device 17, the cross-sectional shape information D17 is superposed at a desired position on the branch point information D16 of the display device 17. Then, according to a termination request from the designer, the display device 17 is requested to end the display, ending the process.

In addition, other different embodiments are possible, for example, the above-described branch point information D16 and the cross-sectional shape information D17 can be displayed on the display device 17 at the same time, or the above-described branch point information D16 and the cross-sectional shape information D17 can be produced in one and displayed on the display device 17.

Figure 17:
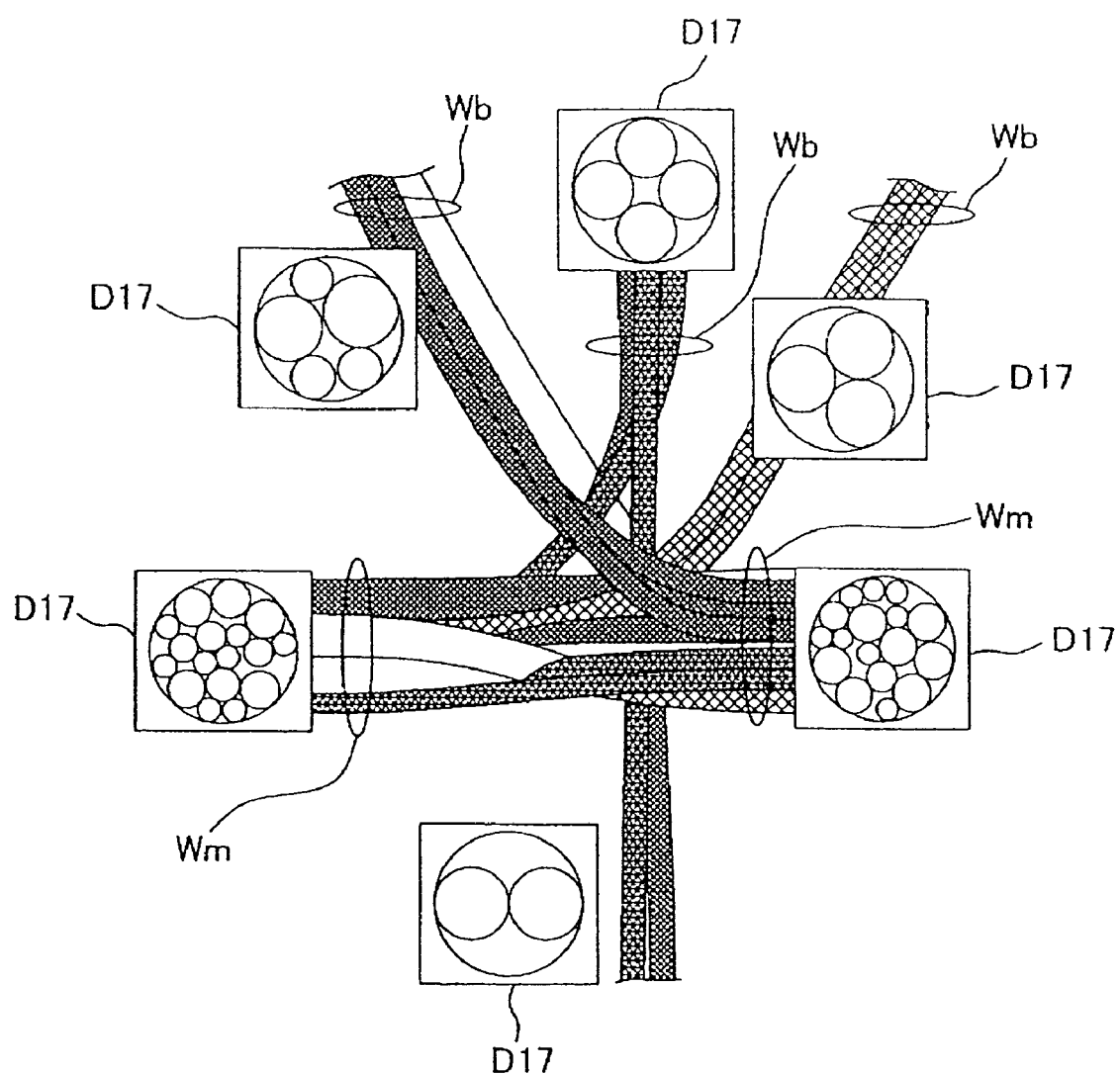
FIG. 17 is an explanatory diagram of display example of branch point information and cross-sectional shape information.

Next, the following describes one embodiment of an operation (action) of the above-described branch angle designing support device 10A with reference to, for example, FIGS. 14, 16, and 17.

The branch angle designing support device 10A, when activated by the designer at a time of designing the three-dimensional structure 2 of the vehicle and such, acquires the circuit information D11 and the path information D12 for the three-dimensional structure 2 from the storage device 14 and such, and collects the electric wire information D13 for the plurality of electric wires 3 constituting the wire harness W1 to be used from the storage device 14 and such.

The circuit information D11 and the path information D12 are associated with each other according to the each end of the plurality of electric wires 3, and based on the associated information, the electric wire path of each of the plurality of electric wire 3 in the planar layout is calculated. Also, according to the path information D12 and the circuit information D11, the respective branch angles θ at the branch point Br for the predetermined path is acquired. Then, the course of the each electric wire 3 branching at the branch angle θ is calculated according to the electric wire information D13 and such. Then, the branch point information D16 for displaying the flow of the each electric wire 3 at the branch point Br is produced and outputted to the display device 17.

Consequently, when the branch point information D16 shown in FIG. 14 is displayed on the display device 17, the designer can compare the number of electric wires 3 branching towards an arrow A and the number of electric wires 3 branching towards an arrow B and thus visually recognize that, for the branch wire Wb branching from the main wire Wm at the branch angle θ, a stress at the branch point Br can be decreased by changing the branch angle θ towards a dotted line arrow direction C in FIG. 14.

Furthermore, when the branch point information D16 shown in FIG. 16 is displayed on the display device 17, when focusing on a main wire Wm1 and the branch wire Wb1 branching from the main wire Wm1, dotted lines indicative of an inner course Ci and an outer course Co for the group of electric wires are superposingly displayed. Therefore, the designer can recognize that the electric wire 3 having the small diameter is positioned in the inner course Ci and the electric wire 3 having the large diameter is positioned in the outer course Co, and thus can presume from the course arrangement whether or not the branch angle θ is appropriate. Consequently, the branch angle θ can be designed even more accurately.

Furthermore, when the branch point information D16 shown in FIG. 17 is displayed on the display device 17, the plurality of cross-sectional shape information D17 are superposingly displayed for each of the main wire Wm and the branch wire Wb indicated by the branch point information D16. Therefore, the designer, by referring to that cross-sectional shape information D17, can easily check the electric wire 3 hidden in a central portion. In addition, a color of the cover material of the each electric wire 3 of the main wire Wm and the branch wire Wb is displayed realistically as the branch point information D16. Consequently, the branch angle θ can be designed even more accurately.

According to the branch angle designing support device 10A described above, by associating the acquired path information D12 and the acquired circuit information D11 with each other, the electric wire path in the planar layout of each of the plurality of electric wires 3 is calculated, and then the branch point information D16 for displaying the flow of the each electric wire 3 at the branch point Br on the wire harness W1 is produced and outputted to the display device 17. Therefore, the designer can check the flow of the each electric wire 3 at the branch point Br on the wire harness W1 as well as the number of branching electric wires 3, thus can support the design of the branch angle such that the stress of the branching bundle of electric wires becomes small. Therefore, the generation of design change during the manufacture of the wire harness W1 can be reduced, the wire harness can be easily prepared, and the durability of the wire harness can be improved.

Furthermore, the electric wire information D13 corresponding to each of the plurality of electric wires 3 is collected, and according to the electric wire information D13 and the electric wire paths, the branch point information D16 for visually displaying the flow and the diameter of the respective electric wires 3 is produced. Consequently, the designer can check the diameter of the electric wire 3 in addition to the flow of the each electric wire 3 at the branch point Br of the wire harness W1 as well as the number of the bundles of electric wires. Therefore, the branch angle θ can be arranged to be more realistic angle. Therefore, the generation of the design change during the manufacture of the wire harness W1 can be reduced even more.

Furthermore, the cross-sectional shape information D17 indicative of a cross-sectional shape of at least one of the main wire Wm and the branch wire Wb branching from the main wire Wm for the branch point Br is produced, according to the electric wire D13 and the electric wire path and the branch point Br, and outputted to support the designing of the branch angle θ. Therefore, the designer can check the cross-sectional shape of the branching bundle of electric wires, thus, based on the cross-sectional shape of the bundle of electric wires, the designer can arrange the branch angle θ to be more realistic angle.

Moreover, the branch angle θ at the branch point Br is acquired, and at least one of the inner course Ci and the outer course Co of the group of electric wires branching at the above-described branch angle θ is calculate, and then the branch point information D16 having the course data indicative of that course is produced. Therefore, the designer can check the inner course Ci and the outer course Co of the branching group of electric wires, thus can arrange the branch angle θ to be a realistic angle. In addition, the course arrangement at the branch point θ can be taken into account for the electric wires 3 extending through the same path, so the length of the each electric wire 3 can be calculated even more accurately. Consequently, the amount of electric wires used can be reduced.

In addition, in the above-described embodiment, the electric wire 3 is displayed realistically by the branch point information D16; however, the present invention is not limited to this, and other embodiments are possible in which, for example, the diameter or the rigidity of the plurality of electric wires 3 are varied by colors.

It is intended that the above-described embodiments are only representative embodiments, and the present invention is not limited thereto. That is, various changes can be made and practiced without departing the scope of the present invention.

The invention claimed is:

1. A planar manufacturing drawing production support device supporting production of a planar manufacturing drawing in which a three-dimensional structure is laid out in a planar manner, according to path plan information indicative of a three-dimensional path plan of the plurality of wire harnesses forming the three-dimensional structure, in order to provide an instruction of manufacture of the three-dimensional structure in a planar form, the planar manufacturing drawing production support device comprising:

a path plan information acquisition unit acquiring the path plan information corresponding to the three-dimensional structure as a support object;

a manufacturing requirement information acquisition unit acquiring manufacturing requirement information indicative of a layout condition used when laying out the three-dimensional structure in a planar form during manufacture;

a layout configuration production unit producing, according to the acquired path plan information and the acquired manufacturing requirement information, a layout configuration model in which the three-dimensional structure is laid out in a planar manner;

a simulation unit simulating a transformation from the layout configuration model produced by the layout configuration production unit to a mounting configuration model with which the three-dimensional structure is mounted to a mount object;

an evaluation unit performing an evaluation of predetermined evaluation items by comparing a simulation result obtained by the simulation unit with the three-dimensional structure indicated by the path plan information; and an evaluation result information output unit outputting evaluation result information indicative of an evaluation result obtained by the evaluation unit in order to support at least one of path designing of the three-dimensional structure and production of the planar manufacturing drawing.

2. The planar manufacturing drawing production support device according to claim 1 comprising a circuit information acquisition unit acquiring circuit information indicative of a circuit formed by plurality of wire harnesses forming the three-dimensional structure as the support object, wherein the layout configuration production unit produces, according to the acquired path plan information and the acquired manufacturing requirement information and the acquired circuit information, a layout configuration model in which the three-dimensional structure is laid out in a planar manner.

3. A planar manufacturing drawing production support method executed by a device, for supporting production of a planar manufacturing drawing in which a three-dimensional structure is laid out in a planar manner, according to path plan information indicative of a three-dimensional path plan of the plurality of wire harnesses forming the three-dimensional structure, in order to provide an instruction of manufacture of the three-dimensional structure in a planar form, the planar manufacturing drawing production support method comprising:

acquiring, by a path plan information acquisition unit, the path plan information corresponding to the three-dimensional structure as a support object;

acquiring, a manufacturing requirement information acquisition unit, manufacturing requirement information indicative of manufacturing requirements for manufacturing the three-dimensional structure in a planar form;

producing, by a layout configuration production unit, according to the acquired path plan information and the acquired manufacturing requirement information, a layout configuration model in which the three-dimensional structure is laid out in a planar manner;

simulating, a simulation unit, a transformation from the layout configuration model produced in the step of producing a layout configuration model to a mounting configuration model with which the three-dimensional structure is mounted to a mount object;

performing, an evaluation unit, an evaluation of predetermined evaluation items by comparing a simulation result obtained from the step of simulating with the three-dimensional structure indicated by the path plan information; and outputting, by an evaluation result information output unit, evaluation result information indicative of an evaluation result obtained from the step of performing an evaluation in order to support at least one of path designing of the three-dimensional structure and production of the planar manufacturing drawing.

4. A planar manufacturing drawing production support non-transitory program product comprising a computer-readable program code executed to cause a computer to support production of a planar manufacturing drawing in which a three-dimensional structure is laid out in a planar manner, according to path plan information indicative of a three-dimensional path plan of the plurality of wire harnesses forming the three-dimensional structure, in order to provide an instruction of manufacture of the three-dimensional structure in a planar form, wherein the computer-readable program code is executed to cause the computer to function as:

a path plan information acquisition unit acquiring the path plan information corresponding to the three-dimensional structure as a support object;

a manufacturing requirement information acquisition unit acquiring manufacturing requirement information indicative of manufacturing requirements for manufacturing the three-dimensional structure in a planar form;

a layout configuration production unit producing, according to the acquired path plan information and the acquired manufacturing requirement information, a layout configuration model in which the three-dimensional structure is laid out in a planar manner;

a simulation unit simulating a transformation from a layout configuration model produced by the layout configuration production unit to a mounting configuration model with which the three-dimensional structure is mounted to a mount object;

an evaluation unit performing an evaluation of predetermined evaluation items by comparing a simulation result obtained from the simulation unit with a three-dimensional structure indicated by the path plan information; and an evaluation result information output unit outputting evaluation result information indicative of an evaluation result obtained from the evaluation unit in order to support at least one of path designing of the three-dimensional structure and production of the planar manufacturing drawing.

* * * * *